(12) United States Patent
Lu et al.

(10) Patent No.: US 12,553,188 B2
(45) Date of Patent: Feb. 17, 2026

(54) GPAM COMPOSITIONS AND METHODS

(71) Applicant: KEMIRA OYJ, Helsinki (FI)

(72) Inventors: Chen Lu, Marietta, GA (US); Christopher Michael Lewis, Helsinki (FI); William James Garrisi, Helsinki (FI)

(73) Assignee: KEMIRA OYJ, Helsinki (FI)

( * ) Notice: Subject to any disclaimer, the term of this patent is extended or adjusted under 35 U.S.C. 154(b) by 467 days.

(21) Appl. No.: 17/910,402

(22) PCT Filed: Mar. 17, 2021

(86) PCT No.: PCT/US2021/022801
§ 371 (c)(1),
(2) Date: Sep. 9, 2022

(87) PCT Pub. No.: WO2021/188701
PCT Pub. Date: Sep. 23, 2021

(65) Prior Publication Data
US 2023/0135892 A1    May 4, 2023

Related U.S. Application Data

(60) Provisional application No. 62/991,380, filed on Mar. 18, 2020.

(30) Foreign Application Priority Data

May 27, 2020   (FI) ........................................ 20205544

(51) Int. Cl.
| | | |
|---|---|---|
| *D21H 21/20* | (2006.01) | |
| *C08F 8/28* | (2006.01) | |
| *C08F 220/56* | (2006.01) | |
| *C08L 33/26* | (2006.01) | |
| *D21H 17/45* | (2006.01) | |

(52) U.S. Cl.
CPC ............... *D21H 21/20* (2013.01); *C08F 8/28* (2013.01); *C08F 220/56* (2013.01); *C08L 33/26* (2013.01); *D21H 17/455* (2013.01); *C08L 2205/025* (2013.01)

(58) Field of Classification Search
CPC .... C08L 33/26; C08L 2205/025; C08L 39/00; D21H 21/20; D21H 17/37; D21H 17/375; D21H 21/18; D21H 17/44; D21H 17/55; D21H 17/455; C08F 8/28; C08F 220/56
See application file for complete search history.

(56) References Cited

U.S. PATENT DOCUMENTS

| | | |
|---|---|---|
| 5,723,022 A | 3/1998 | Dauplaise et al. |
| 2008/0156448 A1* | 7/2008 | Hund .................... C08F 220/56 |
| | | 162/164.6 |
| 2009/0043051 A1* | 2/2009 | Gu ............................ C08F 8/32 |
| | | 526/263 |
| 2016/0201269 A1 | 7/2016 | Wright |

FOREIGN PATENT DOCUMENTS

| | | |
|---|---|---|
| CN | 1224477 | 7/1999 |
| EP | 0 910 700 | 4/1999 |
| WO | 2007041380 | 4/2007 |
| WO | 2009059725 | 5/2009 |

* cited by examiner

*Primary Examiner* — Abbas Rashid
*Assistant Examiner* — Elisa H Vera
(74) *Attorney, Agent, or Firm* — Robin L. Teskin; Baker, Donelson, Bearman, Caldwell & Berkowitz PC

(57) ABSTRACT

The present disclosure generally relates to glyoxalated polyacrylamide (GPAM) compositions, methods of preparation and methods of use thereof, particularly in the paper industry. Moreover, the present disclosure generally pertains to cationic GPAM compositions, methods of preparation and methods of use thereof in papermaking applications and in products such as paper-based products, wherein the cationic GPAM compositions may provide increased wet and/or dry strength to the paper-based products, and wherein such cationic GPAM compositions optionally require a reduced volume of an aqueous carrier for storage or transport compared to a volume of an aqueous carrier needed for conventional GPAMs used in papermaking.

17 Claims, No Drawings

GPAM COMPOSITIONS AND METHODS

RELATED APPLICATIONS

This application is a U.S. National Phase application of Int'l Appl. No. PCT/US2021/022801, filed Mar. 17, 2021, which claims priority to U.S. Provisional Appl. No. 62/991,380, filed Mar. 18, 2020 and Finnish Appl. No. 20205544, filed May 27, 2020, each of which are incorporated herein by reference in their entireties.

FIELD OF THE ART

The present disclosure generally relates to glyoxalated polyacrylamide (GPAM) compositions and articles comprising and methods of use thereof, particularly GPAM compositions that are useful in the paper industry, and more particularly cationic GPAM compositions and use thereof in papermaking applications and in products such as paper-based products. The present disclosure also generally relates to methods of preparing said cationic GPAM compositions.

BACKGROUND

Glyoxalated polyacrylamide (GPAM) compositions are widely used in the paper industry, often to increase paper wet and dry strength. For example, glyoxalated polyacrylamide can increase the initial wet strength of many household tissues, a useful property as household tissues often come into contact with water during their use. Applying glyoxalated polyacrylamide to paper products can also increase the compression strength and the dimensional stability of many board-grade paper products.

GPAM is typically prepared through a reaction between glyoxal and a polyacrylamide base polymer, such as a cationic polyacrylamide backbone. In some instances, the reaction between glyoxal and cationic polyacrylamide is carried out in slightly alkaline aqueous solution and stabilized under acidic conditions. In practice, the polyacrylamide component of the GPAM compositions often contains relatively low amounts of cationic monomer, typically below about 5 mole percent thereof, thereby limiting the cationic charge contribution to the GPAM composition.

Moreover, GPAMs produced by conventional methods generally cannot be dried into a solid particulate form without inducing significant and rapid crosslinking of the GPAM, which limits the utility of the resulting GPAM composition. As such, GPAM compositions are typically stored and transported in a bulk aqueous fluid carrier. The volumes of the GPAM composition transported in this manner can be significant, which often requires large volume containers or tanker vessels for transport. Shipping such large volumes of product significantly increases costs for those transporting and using the GPAM compositions.

As a result of the properties of current GPAM compositions and the logistical considerations regarding their transport, a need remains for GPAM compositions that comprise properties that promote lower shipping costs and/or lower shipping amounts of GPAM compositions while still maintaining the desired properties of the GPAM composition.

BRIEF SUMMARY

The present disclosure generally relates to a cationic glyoxalated polyacrylamide ("GPAM") composition suitable for use as a dry and/or wet strengthening agent, wherein said cationic GPAM composition comprises: a. a first base polymer having a weight average molecular weight of less than 30,000 Da; and b. a second base polymer having a weight average molecular weight of at least 30,000 Da; wherein the first base polymer and the second base polymer have a weight ratio from about 10:90 to about 90:10, optionally from about 20:80 to about 80:20, further optionally from about 30:70 to about 70:30; wherein the first base polymer and the second base polymer are each glyoxalated; and wherein optionally the cationic GPAM composition requires a reduced volume of an aqueous carrier for storage or transport compared to a volume of an aqueous carrier needed for conventional GPAMs used in papermaking.

In some embodiments, the weight average molecular weight of the first base polymer may be at most 25 kDa or less, 20 kDa or less, 15 kDa or less, 10 kDa or less, or 8 kDa or less. In some embodiments, the weight average molecular weight of the second base polymer may be at least 30 kDa or more, 40 kDa or more, 50 kDa or more, 75 kDa or more, 100 kDa or more, 125 kDa or more, 150 kDa or more, 175 kDa or more, 200 kDa or more, 225 kDa or more, 250 kDa or more, 275 kDa or more, 300 kDa or more, 325 kDa or more, 350 kDa or more, 375 kDa or more, 400 kDa or more, or 500 kDa or more. In some embodiments, the glyoxalation percentage of the cationic GPAM composition may be from about 2% to about 90%, optionally from about 3% to about 80%, further optionally from about 4% to about 70%, further optionally from about 5% to about 60%. In some embodiments, the glyoxalation percentage of the first base polymer may be from about 2% to about 90%, optionally from about 3% to about 80%, further optionally from about 4% to about 70%, further optionally from about 5% to about 60%. In some embodiments, the glyoxalation percentage of the second base polymer may be from about 2% to about 90%, optionally from about 3% to about 80%, further optionally from about 4% to about 70%, further optionally from about 5% to about 60%. In some embodiments, the GPAM content of the cationic GPAM composition may be from about 2% to about 20%, optionally from about 3% to about 10%, further optionally from about 4% to about 8%, further optionally from about 5% to about 7%. In some embodiments, the GPAM content of the first base polymer may be from about 2% to about 20%, optionally from about 3% to about 10%, further optionally from about 4% to about 8%, further optionally from about 5% to about 7%. In some embodiments, the GPAM content of the second base polymer may be from about 2% to about 20%, optionally from about 3% to about 10%, further optionally from about 4% to about 8%, further optionally from about 5% to about 7%. In some embodiments, the first base polymer may comprise a cationic charge of at least 5% by weight, at least 10% by weight, at least 15% by weight, at least 20% by weight, at least 25% by weight, at least 30% by weight, at least 35% by weight, at least 40% by weight, at least 50% by weight, or at least 60% by weight, wherein optionally the first base polymer may be amphoteric. In some embodiments, the second base polymer may comprise a cationic charge of at least 5% by weight, at least 10% by weight, at least 15% by weight, at least 20% by weight, at least 25% by weight, at least 30% by weight, at least 35% by weight, at least 40% by weight, at least 50% by weight, or at least 60% by weight, wherein optionally the second base polymer may be amphoteric. In some embodiments, the first base polymer may comprise a cationic monomer percentage of at least 5% by weight, at least 10% by weight, at least 15% by weight, at least 20% by weight, at least 25% by weight, at least 30% by weight, at least 35% by weight, at least 40% by weight, at least 50% by weight, or at least 60% by weight, wherein optionally the first base polymer may be amphoteric. In some embodiments, the second base polymer may comprise a cationic monomer percentage of at least 5% by weight, at least 10% by weight, at least 15% by weight, at least 20% by weight, at least 25% by weight, at least 30% by weight, at least 35% by weight, at least 40% by weight, at least 50% by weight, or at least 60% by weight, wherein optionally the second base polymer may be amphoteric. In some embodiments, the cationic GPAM composition may comprise a solids weight percentage of about 1.0% or more, 2.0% or more, 3.0% or more, 4.0% or more, 5.0% or more, 5.5% or more, 6.0% or more, 6.5% or more, 7.0% or more, 7.5% or more, 8.0% or more, 8.5% or more, 9.0% or more, 9.5% or more, 10.0% or more, 10.5% or more, 11.0% or more, or 11.5% or more. In some embodiments, the cationic GPAM composition may comprise a solids weight percentage of from about 1.0% to about 20.0%, optionally from about 3.0% to about 15.0%. In some embodiments, the cationic GPAM composition may comprise a glyoxal to total base polymer weight ratio of at least about 1:99, at least about 2.5:97.5, at least about 5:95, at least about 7.5:92.5, at least about 10:90, at least about 12.5:87.5, at least about 15:85, at least about 17.5:82.5, at least about 20:80, at least about 22.5:77.5, at least about 25:75, at least about 27.5:72.5, at least about 29:71, or at least about 30:70. In some embodiments, the first base polymer may comprise an acrylamide-based polymer. In some embodiments, the second base polymer may comprise an acrylamide-based polymer. In some embodiments, the first base polymer may comprise one or more cationic monomers. In some embodiments, the second base polymer may comprise one or more cationic monomers. In some embodiments, the first base polymer may comprise a cationic monomer:acrylamide weight ratio of from about 15:85 to about 60:40, optionally from about 20:80 to about 55:45, further optionally from about 25:75 to about 50:50. In some embodiments, the second base polymer may comprise a cationic monomer:acrylamide weight ratio of from about 15:85 to about 60:40, optionally from about 20:80 to about 55:45, further optionally from about 25:75 to about 50:50. In some embodiments, the first base polymer may be amphoteric and may comprise more cationic monomers than anionic monomers. In some embodiments, the second base polymer may be amphoteric and may comprise more cationic monomers than anionic monomers. In some embodiments, the first base polymer may comprise a copolymer of acrylamide or methacrylamide and one or more cationic monomers. In some embodiments, the second base polymer may comprise a copolymer of acrylamide or methacrylamide and one or more cationic monomers. In some embodiments, viscosity of the cationic GPAM composition may be about 10 cPs or more, about 15 cPs or more, about 20 cPs or more, about 25 cPs or more, about 30 cPs or more, or about 35 cPs or more, for example as measured by a LV Brookfield viscometer at 25° C. and 600 rpm using spindle number 1. In some embodiments, the aqueous carrier may comprise water.

In some embodiments, the one or more cationic monomers may each be selected from the group consisting of acryloyloxy ethyl trimethyl ammonium chloride ("AETAC"), methacryloyloxyethyltrimethylammonium chloride, methacrylamidopropyltrimethylammonium chloride ("MAPTAC"), acrylamidopropyltrimethylammonium chloride, methacryloyloxy ethyldimethylammonium sulfate, dimethylaminoethyl acrylate, dimethylaminopropyl methacrylamide, methacryloyloxyethyltrimethylammonium chloride dimethylaminoethyl methacrylate sulfate, diallyldimethylammonium chloride ("DADMAC"); dialkylaminoalkyl acrylates and methacrylates and their quaternary or acid salts, including, but not limited to, dimethylaminoethyl acrylate methyl chloride quaternary salt ("DMAEA.MCQ"), dimethylaminoethyl acrylate methyl sulfate quaternary salt ("DMAEM.MCQ"), dimethyaminoethyl acrylate benzyl chloride quaternary salt ("DMAEA.BCQ"), dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate and diallyldialkylammonium halides such as diallyldiethylammonium chloride and diallyldimethyl ammonium chloride. In some embodiments, the one or more cationic monomers may comprise DADMAC. In some embodiments, the one or more cationic monomers may comprise acryloyloxyethyltrimethyl ammonium chloride ("Q9"). In some embodiments, the one or more cationic monomers may each comprise DADMAC and/or acryloyloxyethyltrimethyl ammonium chloride ("Q9"). In some embodiments, the one or more cationic monomers may each be selected from the group consisting of methacryloyloxyethyltrimethyl ammonium chloride, acryloyloxyethyltrimethyl ammonium chloride (aka Q9), 3-(methacrylamido)propyltrimethyl ammonium chloride, 3-(acryloylamido)propyltrimethyl ammonium chloride, diallyldimethyl ammonium chloride (DADMAC), dimethylaminoethyl acrylate, dimethylaminoethyl methacrylate, and dimethylaminopropyl acrylamide, dimethylaminopropylmethacrylamide.

In some embodiments, the acrylamide-based polymer may comprise one or more primary amide-containing monomers. In some embodiments, the acrylamide-based polymer may comprise one or more monomers selected from the group consisting of acrylamide, methacrylamide, ethylacrylamide, crotonamide, N-methyl acrylamide, N-butyl acrylamide, N-ethyl methacrylamide, and any combination thereof. In some embodiments, the acrylamide-based polymer may comprise one or more acrylamide monomers.

In come exemplary embodiments the cationic GPAM in the GPAM composition are selected from the following:
 a. the first base polymer and the second base polymer comprises a copolymer of acrylamide or methacrylamide and one or more cationic monomers;
 b. the first base polymer and/or the second base polymer comprises a copolymer of (a) acrylamide and/or methacrylamide and acryloyloxyethyltrimethyl ammonium chloride and/or (b) dimethyldiallylammonium chloride (DADMAC) monomers;
 c. the first base polymer or the second base polymer comprises a copolymer of acrylamide and dimethyldiallylammonium chloride (DADMAC) monomers;

d. the first base polymer and the second base polymer comprise a copolymer of acrylamide and dimethyldiallylammonium chloride (DADMAC) monomers;
e. the first base polymer and the second base polymer comprise a copolymer of acrylamide and dimethyldiallylammonium chloride (DADMAC) monomers and the glyoxal:base polymer ratio for the glyoxalation reaction ranges from about 10:90 to 90:10, 20:80 to 80:20, 30:70 to 70:30, 40:60 to 60:40, or is about 29:71;
f. the first base polymer and the second base polymer comprise a copolymer of acrylamide and dimethyldiallylammonium chloride (DADMAC); the molecular weight of the first base polymer is no more than 25 kDa, 20 kDa, 15 kDa, 8 kDa or 5 kDa and the molecular weight of the second base polymer is at least 50 kDa, 100 kDa, 150 kDa, 200 kDa, or 250 kDa or 246 kDa;
g. the first base polymer and the second base polymer comprise a copolymer of acrylamide and dimethyldiallylammonium chloride (DADMAC) monomers; the molecular weight of the first base polymer is no more than 25 kDa, 20 kDa, 15 kDa, 8 kDa or 5 kDa and the molecular weight of the second base polymer is at least 50 kDa, 100 kDa, 150 kDa, 200 kDa, 250 kDa or about 246 kDa; and the glyoxal:base polymer ratio for the glyoxalation reaction used to glyoxylate the first and/or the second base polymer ranges from about 10:90 to 90:10, 20:80 to 80:20, 30:70 to 70:30, 40:60 to 60:40, or is about 29:71;
h. the first base polymer and the second base polymer comprise a copolymer of acrylamide and dimethyldiallylammonium chloride (DADMAC); the molecular weight of the first base polymer is no more than 25 kDa, 20 kDa, 15 kDa, 8 kDa or 5 kDa and the molecular weight of the second base polymer is at least 50 kDa, 100 kDa, 150 kDa, 200 kDa, 250 kDa or about 246 kDa; the glyoxal:base polymer ratio for the glyoxalation reaction of the first and/or second base polymer ranges from about 10:90 to 90:10, 20:80 to 80:20, 30:70 to 70:30, 40:60 to 60:40, or is about 29:71; and the weight ratio of the first base polymer to the second base polymer ranges from about 10:90 to about 90:10, optionally from about 20:80 to about 80:20, further optionally from about 30:70 to about 70:30, still further optionally from about 40:60 to about 60:40; or
i. the first base polymer and the second base polymer comprise a copolymer of acrylamide and dimethyldiallylammonium chloride (DADMAC); the molecular weight of the first base polymer is no more than 25 kDa, 20 kDa, 15 kDa, 8 kDa or 5 kDa and the molecular weight of the second base polymer is at least 50 kDa, 100 kDa, 150 kDa, 200 kDa, 250 kDa or about 246 kDa; the glyoxal:base polymer ratio for the glyoxalation reaction of the first and/or second base polymer ranges from about 10:90 to 90:10, 20:80 to 80:20, 30:70 to 70:30, 40:60 to 60:40, or is about 29:71; and the weight ratio of the first base polymer to the second base polymer ranges from about 10:90 to about 90:10, optionally from about 20:80 to about 80:20, further optionally from about 30:70 to about 70:30, still further optionally from about 40:60 to about 60:40 and the GPAM content ranges from about 5% to about 7%, or about 6%-7.5%, or about 6% to 7%.

Additionally, the present disclosure generally relates to a paper product comprising one or more cationic GPAM compositions as discussed herein. In some embodiments, said paper product may comprise at least one paper layer or web containing the cationic GPAM composition. In some embodiments, the paper product may comprise the cationic GPAM composition on at least one surface of the paper product. In some embodiments, said paper product may comprise one or more of paper sheeting, paperboard, tissue paper, and wall board. In some embodiments, said paper product may comprise one or more of Kraft paper, sulfite paper, semi-chemical paper, and the like, including paper produced using bleached pulp, unbleached pulp, or combinations thereof. In some embodiments, said paper product may comprise a fiber-based product. In some embodiments, said paper product may comprise one or more of handsheets, board-based products, beverage carriers, toweling, milk and juice cartons, food trays, paper bags, liner board for corrugated containers, packaging board grade, and tissue and towel grade, paper materials, paper towels, diapers, sanitary napkins, training pants, pantiliners, incontinence briefs, tampons, pee pads, litter box liners, coffee filters, air filters, dryer pads, floor cleaning pads, absorbent facial tissue, absorbent bathroom tissue, napkins, wrapping paper, and/or other paperboard products such as cartons and bag paper. In some embodiments, said paper product may comprise cellulose paperboard webs which optionally comprise predominantly cellulose fibers. In some embodiments, said paper product may comprise from about 0.02% to about 10% cationic GPAM composition by dry weight of cellulose fibers, optionally in the range of about 0.05 wt % to 5 wt % of the dry paper weight. In some embodiments, the paper product may comprise an improved paper strength, e.g. as determined by STFI testing, compared to a paper product that does not comprise a cationic GPAM composition. For example, in some embodiments, said paper product may comprise an STFI value improvement of 6% or more, 7% or more, 8% or more, 9% or more, 10% or more, 12.5% or more, 15.0% or more, 17.5% or more, 20.0% or more, 22.5% or more, 25.0% or more at either 4.5 lbs/ton, 5.0 lbs/ton, 9.0 lbs/ton or 10 lbs/ton testing as compared to a blank sample used for the STFI test of the paper product. In some embodiments, the paper product may comprise an improved paper strength, e.g. as determined by burst strength testing, compared to a paper product that does not comprise a cationic GPAM composition. For example, in some embodiments, said paper product may comprise a burst strength value improvement of 6% or more, 7% or more, 8% or more, 9% or more, 10% or more, 12.5% or more, 15.0% or more, 17.5% or more, 20.0% or more, 22.5% or more, 25.0% or more, 27.5% or more, 30.0% or more, 32.5% or more, 35.0% or more, 37.5% or more, or 40% or more at either 4.5 lbs/ton, 5.0 lbs/ton, 9.0 lbs/ton or 10 lbs/ton testing as compared to a blank sample used for the burst strength test.

In come exemplary embodiments the paper product comprising one or more cationic GPAM compositions comprises a cationic GPAM wherein:
a. the first base polymer and the second base polymer comprises a copolymer of acrylamide or methacrylamide monomers and one or more cationic monomers;
b. the first base polymer and/or the second base polymer comprises a copolymer of (a) acrylamide and/or methacrylamide and acryloyloxyethyltrimethyl ammonium chloride and/or (b) dimethyldiallylammonium chloride (DADMAC) monomers;
c. the first base polymer or the second base polymer comprises a copolymer of acrylamide and dimethyldiallylammonium chloride (DADMAC) monomers;
d. the first base polymer and the second base polymer comprise a copolymer of acrylamide and dimethyldiallylammonium chloride (DADMAC) monomers;

e. the first base polymer and the second base polymer comprise a copolymer of acrylamide and dimethyldiallylammonium chloride (DADMAC) and the glyoxal:base polymer ratio for the glyoxalation reaction ranges from about 10:90 to 90:10, 20:80 to 80:20, 30:70 to 70:30, 40:60 to 60:40, or is about 29:71 monomers;

f. the first base polymer and the second base polymer comprise a copolymer of acrylamide and dimethyldiallylammonium chloride (DADMAC); the molecular weight of the first base polymer is no more than 25 kDa, 20 kDa, 15 kDa, 8 kDa or 5 kDa and the molecular weight of the second base polymer is at least 50 kDa, 100 kDa, 150 kDa, 200 kDa, or 250 kDa or 246 kDa;

g. the first base polymer and the second base polymer comprise a copolymer of acrylamide and dimethyldiallylammonium chloride (DADMAC) monomers; the molecular weight of the first base polymer is no more than 25 kDa, 20 kDa, 15 kDa, 8 kDa or 5 kDa and the molecular weight of the second base polymer is at least 50 kDa, 100 kDa, 150 kDa, 200 kDa, 250 kDa or about 246 kDa; and the glyoxal:base polymer ratio for the glyoxalation reaction used to glyoxylate the first and/or the second base polymer ranges from about 10:90 to 90:10, 20:80 to 80:20, 30:70 to 70:30, 40:60 to 60:40, or is about 29:71;

h. the first base polymer and the second base polymer comprise a copolymer of acrylamide and dimethyldiallylammonium chloride (DADMAC); the molecular weight of the first base polymer is no more than 25 kDa, 20 kDa, 15 kDa, 8 kDa or 5 kDa and the molecular weight of the second base polymer is at least 50 kDa, 100 kDa, 150 kDa, 200 kDa, 250 kDa or about 246 kDa; the glyoxal:base polymer ratio for the glyoxalation reaction of the first and/or second base polymer ranges from about 10:90 to 90:10, 20:80 to 80:20, 30:70 to 70:30, 40:60 to 60:40, or is about 29:71; and the weight ratio of the first base polymer to the second base polymer ranges from about 10:90 to about 90:10, optionally from about 20:80 to about 80:20, further optionally from about 30:70 to about 70:30, still further optionally from about 40:60 to about 60:40; or i. the first base polymer and the second base polymer comprise a copolymer of acrylamide and dimethyldiallylammonium chloride (DADMAC) monomers; the molecular weight of the first base polymer is no more than 25 kDa, 20 kDa, 15 kDa, 8 kDa or 5 kDa and the molecular weight of the second base polymer is at least 50 kDa, 100 kDa, 150 kDa, 200 kDa, 250 kDa or about 246 kDa; the glyoxal:base polymer ratio for the glyoxalation reaction of the first and/or second base polymer ranges from about 10:90 to 90:10, 20:80 to 80:20, 30:70 to 70:30, 40:60 to 60:40, or is about 29:71; and the weight ratio of the first base polymer to the second base polymer ranges from about 10:90 to about 90:10, optionally from about 20:80 to about 80:20, further optionally from about 30:70 to about 70:30, still further optionally from about 40:60 to about 60:40 and the GPAM content ranges from about 5% to about 7%, or about 6%-7.5%, or about 6% to 7%.

Moreover, the present disclosure generally relates to a method of papermaking, wherein said method comprises adding one or more cationic GPAM compositions as discussed herein during the papermaking method in an amount effective to increase the wet and/or dry strength of paper products produced by said method. In some embodiments, the one or more cationic GPAM compositions may be added to a composition comprising fiber and/or pulp used in the method prior to the paper product being formed. In some embodiments, the one or more cationic GPAM compositions may be added to one or more surfaces of the paper product after the paper product is formed.

Furthermore, the present disclosure generally relates to a method of making a handsheet, said method comprising: a. providing a pulp stock; b. diluting the pulp stock; c. adding one or more salts to a desired level of conductivity; d. adjusting the pH to a desired value; e. adding one or more cationic GPAM compositions as discussed herein; f. adding the treated pulp to a dynamic sheet former; g. pressing the sheets resulting from f.; h. drying the sheets; and i. conditioning the sheets.

Additionally, the present disclosure generally pertains to a method of manufacturing one or more paper products, wherein said method comprises: a. providing a composition comprising predominantly cellulose fibers; b. adding a predetermined quantity of one or more cationic GPAM compositions as discussed herein; and c. forming the desired paper product.

Furthermore, the present disclosure generally relates to a method of manufacturing one or more paper products, optionally one or more adsorbent paper products, wherein said method comprises: a. providing a composition comprising any of softwood fiber, hardwood fiber, recycle fiber, refined fiber, or a mixture of any of the foregoing in an amount sufficient to form an overall furnish of from approximately 1 to 100% hardwood fiber, softwood fiber, recycle fiber, refined fiber or a mixture of any of the foregoing; (b) adding a predetermined quantity of one or more cationic GPAMs as discussed herein; and (c) forming a paper product by drying via one or more drying means to a desired moisture content level.

Moreover, the present disclosure generally relates to a method for strengthening paper, comprising contacting pulp fibers with a strengthening resin comprising at least cationic GPAM composition as discussed herein, and at least partially curing the cationic GPAM in the mixture of pulp fibers and cationic GPAM to produce a paper product of enhanced strength.

In some embodiments, the cationic GPAM composition may be added at the wet end of a paper-making facility to the cellulose fiber suspensions. In some embodiments, the cationic GPAM composition may be added at from about 0.02% by dry weight to about 10% by dry weight of the cellulose fibers, optionally in the range of about 0.05 wt % to 5 wt % of the dry paper weight. In some embodiments, the cationic GPAM composition may be added before, during and/or after the paper is formed. In some embodiments, the cationic GPAM composition may be added to one or more surfaces of the paper product after the paper product is formed. In some embodiments, the cationic GPAM composition may provide a paper strength enhancement to the paper product, e.g., as determined by STFI testing. For example, in some embodiments, the paper product may comprise an STFI value improvement of 6% or more, 7% or more, 8% or more, 9% or more, 10% or more, 12.5% or more, 15.0% or more, 17.5% or more, 20.0% or more, 22.5% or more, 25.0% or more at either 4.5 lbs/ton, 5.0 lbs/ton, 9.0 lbs/ton or 10 lbs/ton testing as compared to a blank sample used for the STFI test of the paper product. In some embodiments, the cationic GPAM composition may provide a paper strength enhancement to the paper product, e.g., as determined by burst strength testing. For example, in some embodiments, the paper product may comprise a burst strength value improvement of 6% or more, 7% or more, 8% or more, 9% or more, 10% or more, 12.5% or more, 15.0% or more, 17.5% or more, 20.0% or more, 22.5% or more, 25.0% or more, 27.5% or more, 30.0% or more, 32.5% or more, 35.0% or more, 37.5% or more, or 40% or more at either 4.5 lbs/ton, 5.0 lbs/ton, 9.0 lbs/ton or 10 lbs/ton testing as compared to a blank sample used for the burst strength test. In some embodiments, the paper product may comprise one or more of handsheets, board-based products, beverage carriers, toweling, milk and juice cartons, food trays, paper bags, liner board for corrugated containers, packaging board grade, and tissue and towel grade, paper materials, paper towels, diapers, sanitary napkins, training pants, pantiliners, incontinence briefs, tampons, pee pads, litter box liners, coffee filters, air filters, dryer pads, floor cleaning pads, absorbent facial tissue, absorbent bathroom tissue, napkins, wrapping paper, and/or other paperboard products such as cartons and bag paper. In some embodiments, the paper product may comprise cellulose paperboard webs which optionally comprise predominantly cellulose fibers. In some embodiments, the cationic GPAM composition may decrease a drainage time of a treated sample compared to a drainage time without use of the cationic GPAM composition. For example, in some embodiments, cationic GPAM compositions may effect efficient drainage, e.g., drainage of OCC pulp, such as demonstrating an improvement in drainage time, e.g., time to collect a given amount of filtrate from OCC pulp, of 25.0% or more, 30.0% or more, 35.0% or more, 40.0% or more, 45.0% or more, 50.0% or more, 55.0% or more as compared to the drainage without the use of a cationic GPAM composition. In some embodiments, the cationic GPAM composition may increase a drainage rate of a treated sample resulting in an increased paper production rate as compared to a drainage rate without use of the cationic GPAM composition. In some embodiments, cationic GPAM compositions may improve drying energy savings of the paper-making product. Furthermore, cationic GPAM compositions may effect a decrease in the total amount of solids present in a treated sample, e.g., a decrease in the total solids present in a filtrate collected from OCC pulp treated with a cationic GPAM composition, e.g., a decrease in the solid content of white water from tray or silo post sheet forming, such as an improvement (decrease in solids content) of 15% or more, 17.5% or more, 20.0% or more, 22.5% or more, 25.0% or more, 27.5% or more, 30.0% or more, or 32.5% or more, as compared to the total amount of solids present in a sample without the use of a cationic GPAM composition. In some embodiments, the cationic GPAM composition may improve drying energy savings.

Additionally, the present disclosure generally relates to a method for preparing the cationic GPAM composition discussed herein, particularly the cationic GPAM composition comprising a. a first base polymer having a weight average molecular weight of less than 30,000 Da; and b. a second base polymer having a weight average molecular weight of at least 30,000 Da; wherein the first base polymer and the second base polymer have a weight ratio from about 10:90 to about 90:10, optionally from about 20:80 to about 80:20, further optionally from about 30:70 to about 70:30; wherein the first base polymer and the second base polymer are each glyoxalated; and wherein optionally the cationic GPAM composition requires a reduced volume of an aqueous carrier for storage or transport compared to a volume of an aqueous carrier needed for conventional GPAMs used in papermaking. In some embodiments, the method may comprise a. glyoxalating the first base polymer in a first glyoxalation reaction comprising glyoxal to produce a first glyoxalated base polymer; b. glyoxalating the second base polymer in a second glyoxalation reaction comprising glyoxal to produce a second glyoxalated base polymer, wherein optionally the first and/or second base polymer comprises or consists of acrylamide or methacrylamide, and DADMAC or acryloyloxyethyltrimethyl ammonium chloride charged monomers; and c. combining the first glyoxalated base polymer and the second glyoxalated base polymer to produce the cationic GPAM composition; wherein steps (a) and (b) may be performed in any order or simultaneously. In some embodiments, the method may comprise a. combining the first base polymer and the second base polymer; and b. glyoxalating the combination of the first base polymer and the second base polymer in a glyoxalation reaction comprising glyoxal to produce the cationic GPAM composition. In some embodiments, the method may comprise a. glyoxalating the first base polymer in a glyoxalation reaction comprising glyoxal to produce a first glyoxalated base polymer; and b. adding the second base polymer and optionally additional glyoxal to the glyoxalation reaction to produce the cationic GPAM composition. In some embodiments, the method may comprise a. glyoxalating the second base polymer in a glyoxalation reaction comprising glyoxal to produce a second glyoxalated base polymer; and b. adding the first base polymer and optionally additional glyoxal to the glyoxalation reaction to produce the cationic GPAM composition. In some embodiments, the method may comprise a. glyoxalating the first base polymer in a first glyoxalation reaction comprising glyoxal to produce a first glyoxalated base polymer; and b. glyoxalating the second base polymer in a second glyoxalation reaction comprising glyoxal and the first glyoxalated base polymer to produce the cationic GPAM composition. In some embodiments, the method may comprise a. glyoxalating the second base polymer in a second glyoxalation reaction comprising glyoxal to produce a second glyoxalated base polymer; and b. glyoxalating the first base polymer in a first glyoxalation reaction comprising glyoxal and the second glyoxalated base polymer to produce the cationic GPAM composition.

Further, the present disclosure provides cationic GPAM compositions produced by any of the afore-mentioned methods.

Additionally, the present disclosure provides compositions comprising one or more cationic GPAM compositions produced by one or more of the afore-mentioned methods.

DETAILED DESCRIPTION

Definitions

As used herein the singular forms "a", "an", and "the" include plural referents unless the context clearly dictates otherwise. All technical and scientific terms used herein have the same meaning as commonly understood to one of ordinary skill in the art to which this invention belongs unless clearly indicated otherwise.

As used herein unless specified to the contrary when we refer to a "%" in relation to a compound or composition it means "wt. %" or "% by wt.".

As used herein, the term "monomer" generally refers to nonionic monomers, anionic monomers, cationic monomers, zwitterionic monomers, betaine monomers, and amphoteric ion pair monomers.

As used herein, the terms "polymer," "polymers," "polymeric," and similar terms are used in their ordinary sense as understood by one skilled in the art, and thus may be used herein to refer to or describe a large molecule (or group of such molecules) that comprise recurring units. Polymers may be formed in various ways, including by polymerizing monomers and/or by chemically modifying one or more recurring units of a precursor polymer. Unless otherwise specified, a polymer may comprise a "homopolymer" that may comprise substantially identical recurring units that may be formed by various methods e.g., by polymerizing a particular monomer. Unless otherwise specified, a polymer may also comprise a "copolymer" that may comprise two or more different recurring units that may be formed by, e.g., copolymerizing, two or more different monomers, and/or by chemically modifying one or more recurring units of a precursor polymer. Unless otherwise specified, a polymer or copolymer may also comprise a "terpolymer" that may comprise polymers that may comprise three or more different recurring units. The term "polymer" as used herein is intended to include both the acid form of the polymer as well as its various salts. Polymers may be amphoteric in nature, i.e., containing both anionic and cationic substituents, although not necessarily in the same proportions.

As used herein the term "nonionic monomer" generally refers to a monomer that possesses a neutral charge.

As used herein, the term "anionic monomers" may refer to either anionic monomers that are substantially anionic in whole or (in equilibrium) in part, at a pH in the range of about 4.0 to about 9.0. The "anionic monomers" may be neutral at low pH (from a pH of about 2 to about 6), or may be anionic monomers that are anionic at low pH. In some embodiments, anionic monomers, e.g., vinyl monomers, may comprise but are not limited to those comprising a carboxylic acid functional group, a sulfonic acid functional group, a phosphonic acid functional group, and their corresponding water soluble salts, and any combinations thereof. In some embodiments, anionic monomers may comprise acrylic acid, methacrylic acid, maleic acid, itaconic acid, vinyl sulfonic acid, 2-acrylamido-2-methylpropane sulfonic acid (AMPS), acrylamido methane sulfonic acid, acrylamido ethane sulfonic acid, 2-hydroxy-3-acrylamide propane sulfonic acid, styrene sulfonic acid, vinyl phosphonic acid, and combinations thereof, as well as their corresponding water soluble or dispersible alkali metal, alkaline earth metal, and ammonium salts, and any combinations thereof. In some embodiments, the cationic GPAM composition may comprise base polymers which are optionally amphoteric, i.e., base polymers comprising both cationic and anionic monomers.

As used herein, the term "cationic monomer" generally refers to a monomer that possesses a positive charge. Examples of cationic monomers may comprise but are not limited to those comprising acryloyloxy ethyl trimethyl ammonium chloride ("AETAC"), methacryloyloxyethyltrimethylammonium chloride, methacrylamidopropyltrimethylammonium chloride ("MAPTAC"), acrylamidopropyltrimethylammonium chloride, methacryloyloxyethyldimethylammonium sulfate, dimethylaminoethyl acrylate, dimethylaminopropylmethacrylamide, methacryloyloxyethyltrimethylammonium chloride dimethylaminoethyl methacrylate sulfate, and/or diallyldimethylammonium chloride ("DADMAC"). Said cationic monomers may also comprise but are not limited to comprising dialkylaminoalkyl acrylates and methacrylates and their quaternary or acid salts, including, but not limited to, dimethylaminoethyl acrylate methyl chloride quaternary salt ("DMAEA.MCQ"), dimethylaminoethyl acrylate methyl sulfate quaternary salt ("DMAEM.MCQ"), dimethyaminoethyl acrylate benzyl chloride quaternary salt ("DMAEA.BCQ"), dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate and diallyldialkylammonium halides such as diallyldiethylammonium chloride and diallyldimethyl ammonium chloride. Alkyl groups may generally comprise but are not limited to those comprising $C_{1-8}$ alkyl groups. In some embodiments, cationic monomers may comprise quaternary ammonium or acid salts of vinyl amide, vinyl carboxylic acid, methacrylate and their derivatives. Cationic monomers can be combined, for example, to form a terpolymer of dimethylaminoethylmethacrylate methyl chloride quaternary salt, and diallyldimethyl ammonium chloride and acrylamide.

As used herein, the term "glyoxalation percentage" refers to the percentage of acrylamide-based monomers which are glyoxalated in a polymer of the cationic GPAM composition, e.g., the first base polymer and/or the second base polymer.

As used herein, the term "GPAM content" refers to the sum of the glyoxalated base polymer(s) plus free glyoxal in the cationic GPAM composition.

As used herein, the terms "papermaking process" and "papermaking application" generally refer to any process in which any form of paper and/or paperboard product may be produced. For example, such processes include making paper products from pulp, such as methods comprising forming an aqueous cellulosic papermaking furnish, draining the furnish to form a sheet, and drying the sheet. The steps of forming the papermaking furnish, draining and drying may be carried out in any conventional manner generally known in the art.

As used herein, the terms "polyacrylamide" or "PAM" generally refer to polymers and co-polymers comprising acrylamide moieties, and the terms encompass any polymers or copolymers comprising acrylamide moieties, e.g., one or more acrylamide (co)polymers. In some instances, PAMs may comprise anionic PAMs (APAMs), cationic PAMs (CPAMs), and/or sulfonated PAMs (SPAMs). In some embodiments, a polyacrylamide may be a cationic polyacrylamide (cPAM).

As used herein, the term "glyoxalated polyacrylamide" ("GPAM") generally refers to a polymer obtained by reacting glyoxal and a polyacrylamide base polymer. Methods for producing glyoxalated polyacrylamides are known in the art. (See e.g., U.S. Pat. No. 3,556,932 which first disclosed the synthesis of a GPAM composition prepared by reacting glyoxal with a cationic polyacrylamide). In some instances, the polyacrylamide backbone of the GPAM can incorporate a small amount of a cationic monomer, rendering the polymer self-retaining on fibers. In general, GPAM comprises a reactive polymer that can covalently bind with cellulose upon dehydration.

The present invention provides cationic GPAM compositions having specific properties which are well suited for use in papermaking processes, i.e., for use as additives for increasing paper wet and/or dry strength; and which possess enhanced storage and transport properties, e.g., unlike conventional GPAMs used in papermaking processes, the subject cationic GPAMs can be stored and transported without the need for the addition of large volumes of aqueous carriers, which is undesirable as well as costly as this generally requires large volume containers or tanker vessels for transport. In some instances, the aqueous carrier may comprise water. In some instances, the volume of aqueous carrier used during transport of the cationic GPAMs discussed herein may be less than that used to transport a conventional GPAM. For example, in some instances conventional GPAMs may comprise a solids percentage of 4% or less, whereas in some embodiments cationic GPAM compositions may comprise a solids percentage of greater than 4%, i.e., from greater than 4% to about 11%, e.g., from about greater than 4% to about 9%, from about greater than 5% to about 8%, or from about 6% to about 7.5%.

As used herein, the terms "cationic GPAM" or "cationic GPAM composition" generally refers to a GPAM composition comprising a first base polymer having a weight average molecular weight of less than 30,000 Da and a second base polymer having a weight average molecular weight of at least 30,000 Da, wherein the first base polymer and the second base polymer have a weight ratio from about 10:90 to about 90:10, optionally from about 20:80 to about 80:20, optionally from about 30:70 to about 70:30, wherein the first base polymer and the second base polymer are each glyoxalated, and wherein optionally the cationic GPAM composition requires a reduced volume of an aqueous carrier for storage or transport compared to a volume of an aqueous carrier needed for conventional GPAMs used in papermaking. In some embodiments, the weight average molecular weight of the first base polymer may be at most 25 kDa or less, 20 kDa or less, 15 kDa or less, 10 kDa or less, or 8 kDa or less. In some embodiments, the weight average molecular weight of the second base polymer may be at least 30 kDa or more, 40 kDa or more, 50 kDa or more, 75 kDa or more, 100 kDa or more, 125 kDa or more, 150 kDa or more, 175 kDa or more, 200 kDa or more, 225 kDa or more, 250 kDa or more, 275 kDa or more, 300 kDa or more, 325 kDa or more, 350 kDa or more, 375 kDa or more, 400 kDa or more, or 500 kDa or more. In some embodiments, the glyoxalation percentage of the cationic GPAM composition may be from about 2% to about 90%, optionally from about 3% to about 80%, further optionally from about 4% to about 70%, further optionally from about 5% to about 60%. In some embodiments, the glyoxalation percentage of the first base polymer may be from about 2% to about 90%, optionally from about 3% to about 80%, further optionally from about 4% to about 70%, further optionally from about 5% to about 60%. In some embodiments, the glyoxalation percentage of the second base polymer may be from about 2% to about 90%, optionally from about 3% to about 80%, further optionally from about 4% to about 70%, further optionally from about 5% to about 60%. In some embodiments, the GPAM content of the cationic GPAM composition may be from about 2% to about 20%, optionally from about 3% to about 10%, further optionally from about 4% to about 8%, further optionally from about 5% to about 7%. In some embodiments, the GPAM content of the first base polymer may be from about 2% to about 20%, optionally from about 3% to about 10%, further optionally from about 4% to about 8%, further optionally from about 5% to about 7%. In some embodiments, the GPAM content of the second base polymer may be from about 2% to about 20%, optionally from about 3% to about 10%, further optionally from about 4% to about 8%, further optionally from about 5% to about 7%. In some embodiments, the first base polymer may comprise a cationic charge of at least 5% by weight, at least 10% by weight, at least 15% by weight, at least 20% by weight, at least 25% by weight, at least 30% by weight, at least 35% by weight, at least 40% by weight, at least 50% by weight, or at least 60% by weight, wherein optionally the first base polymer is amphoteric. In some embodiments, the second base polymer may comprise a cationic charge of at least 5% by weight, at least 10% by weight, at least 15% by weight, at least 20% by weight, at least 25% by weight, at least 30% by weight, at least 35% by weight, at least 40% by weight, at least 50% by weight, or at least 60% by weight, wherein optionally the second base polymer is amphoteric. In some embodiments, the first base polymer may comprise a cationic monomer percentage of at least 5% by weight, at least 10% by weight, at least 15% by weight, at least 20% by weight, at least 25% by weight, at least 30% by weight, at least 35% by weight, at least 40% by weight, at least 50% by weight, or at least 60% by weight, wherein optionally the first base polymer may be amphoteric. In some embodiments, the second base polymer may comprise a cationic monomer percentage of at least 5% by weight, at least 10% by weight, at least 15% by weight, at least 20% by weight, at least 25% by weight, at least 30% by weight, at least 35% by weight, at least 40% by weight, at least 50% by weight, or at least 60% by weight, wherein optionally the second base polymer may be amphoteric. In some embodiments, the cationic GPAM composition may comprise a solids weight percentage of about 1.0% or more, 2.0% or more, 3.0% or more, 4.0% or more, 5.0% or more, 5.5% or more, 6.0% or more, 6.5% or more, 7.0% or more, 7.5% or more, 8.0% or more, 8.5% or more, 9.0% or more, 9.5% or more, 10.0% or more, 10.5% or more, 11.0% or more, or 11.5% or more. In some embodiments, the cationic GPAM composition may comprise a solids weight percentage of from about 1.0% to about 20.0%, optionally from about 3.0% to about 15%. In some embodiments, the cationic GPAM composition may comprise a glyoxal to total base polymer weight ratio of at least about 1:99, at least about 2.5:97.5, at least about 5:95, at least about 7.5:92.5, at least about 10:90, at least about 12.5:87.5, at least about 15:85, at least about 17.5:82.5, at least about 20:80, at least about 22.5:77.5, at least about 25:75, at least about 27.5:72.5, at least about 29:71, or at least about 30:70. In some embodiments, the first base polymer may comprise an acrylamide-based polymer. In some embodiments, the second base polymer may comprise an acrylamide-based polymer. In some embodiments, the first base polymer may comprise one or more cationic monomers. In some embodiments, the second base polymer may comprise one or more cationic monomers. In some embodiments, the first base polymer may comprise a cationic monomer:acrylamide weight ratio of from about 15:85 to about 60:40, optionally from about 20:80 to about 55:45, further optionally from about 25:75 to about 50:50. In some embodiments, the second base polymer may comprise a cationic monomer:acrylamide weight ratio of from about 15:85 to about 60:40, optionally from about 20:80 to about 55:45, further optionally from about 25:75 to about 50:50. In some embodiments, the first base polymer is amphoteric and comprises more cationic monomers than anionic monomers.

In some embodiments, the second base polymer is amphoteric and comprises more cationic monomers than anionic monomers. In some embodiments, the first base polymer may comprise a copolymer of acrylamide or methacrylamide and one or more cationic monomers. In some embodiments, the second base polymer may comprise a copolymer of acrylamide or methacrylamide and one or more cationic monomers. In some embodiments, the one or more cationic monomers may comprise DADMAC and/or may comprise acryloyloxyethyltrimethyl ammonium chloride (aka Q9). In some embodiments, the back bone polymer may comprise an acrylamide-based polymer, wherein the acrylamide monomer is replaced by other primary amide-containing monomers such as methacrylamide, ethylacrylamide, crotonamide, N-methyl acrylamide, N-butyl acrylamide, or N-ethyl methacrylamide, or any combination thereof. In some embodiments, the back bone polymer may comprise acrylamide monomers. In some embodiments, viscosity of the cationic GPAM composition may be about 10 cPs or more, about 15 cPs or more, about 20 cPs or more, about 25 cPs or more, about 30 cPs or more, or about 35 cPs or more, for example as measured by a LV Brookfield viscometer at 25° C. and 600 rpm using spindle number 1. The cationic GPAM compositions described herein may be used in any papermaking process, as further described herein. Moreover, the cationic GPAM compositions described herein possess properties that should lower shipping costs and manufacturing costs, thereby providing benefits to manufacturers and end-users of the cationic GPAM compositions.

As used herein, the term "white water" generally refers to the process water and/or produced water that may be removed from the pulp furnish during formation of a paper product, such as a sheet, e.g., a handsheet.

Compositions and Methods

I. Cationic GPAM Compositions

GPAM compositions have known usage in the paper industry, typically as wet and/or dry strengthening agents. However, conventional GPAMs generally need to be stored and transported in a bulk aqueous carrier fluid in large volumes, which often requires large volume containers or tanker vessels for transport. Shipping such large volumes of product significantly increases costs for those transporting and using the GPAM compositions. As such, there is a need for improved GPAM compositions, such as those comprising cationic GPAMs, which, based on their composition are useful in papermaking processes and which possess storage properties that should result in reduced shipping costs.

Toward that end, the present disclosure generally relates to improved glyoxalated polyacrylamide (GPAM) compositions which are suitable for use as a dry and/or wet strengthening agent, wherein said cationic GPAM compositions comprise a first base polymer having a weight average molecular weight of less than 30,000 Da and a second base polymer having a weight average molecular weight of at least 30,000 Da, wherein the first base polymer and the second base polymer have a weight ratio from about 10:90 to about 90:10, optionally from about 20:80 to about 80:20, further optionally from about 30:70 to about 70:30, wherein the first base polymer and the second base polymer are each glyoxalated, which compositions are useful in papermaking processes and which possess improved storage properties that should result in reduced shipping costs, further optionally wherein the cationic GPAM composition requires a reduced volume of an aqueous carrier for storage or transport compared to a volume of an aqueous carrier needed for conventional GPAMs used in papermaking. For example, the volume of aqueous carrier used during transport of the cationic GPAM compositions discussed herein may be less than that used to transport a conventional GPAM. For example, in some instances, conventional GPAMs may comprise a solids percentage of 4% or less, whereas in some embodiments, cationic GPAM compositions may comprise a solids percentage of greater than 4%, i.e., from greater than 4% to about 11%, e.g., from about greater than 5% to about 9%, e.g., from about greater than 5% to about 8%, or from about 6% to about 7.5%.

In some embodiments, the cationic GPAM composition may comprise a first base polymer having a weight average molecular weight of at most 25 kDa or less, 20 kDa or less, 15 kDa or less, 10 kDa or less, or 8 kDa or less. In some embodiments, the cationic GPAM may comprise a second base polymer having a weight average molecular weight of at least 30 kDa or more, 40 kDa or more, 50 kDa or more, 75 kDa or more, 100 kDa or more, 125 kDa or more, 150 kDa or more, 175 kDa or more, 200 kDa or more, 225 kDa or more, 250 kDa or more, 275 kDa or more, 300 kDa or more, 325 kDa or more, 350 kDa or more, 375 kDa or more, 400 kDa or more, or 500 kDa or more.

In some embodiments, the glyoxalation percentage of the cationic GPAM composition may be from about 2% to about 90%, optionally from about 3% to about 80%, further optionally from about 4% to about 70%, further optionally from about 5% to about 60%. In some embodiments, the glyoxalation percentage of the first base polymer may be from about 2% to about 90%, optionally from about 3% to about 80%, further optionally from about 4% to about 70%, further optionally from about 5% to about 60%. In some embodiments, the glyoxalation percentage of the second base polymer may be from about 2% to about 90%, optionally from about 3% to about 80%, further optionally from about 4% to about 70%, further optionally from about 5% to about 60%.

In some embodiments the weight average molecular weight of the first base polymer ranges from no more than 2 to 25 kDa, 5-20 kDa, or 5-15 kDa.

In some embodiments the weight average molecular weight of the second base polymer ranges from at least 100 kDa to 500 kDa, 150-400 kDa, 200-300 kDa, 225 kDa to 275 kDa or is about 250 kDa.

In some embodiments either or both the first and the second base polymer comprise copolymers of a first monomer comprising acrylamide or methacrylamide and a second monomer comprising DADMAC (dimethyldiallylammonium chloride) or Q9, optionally wherein the first monomer comprises acrylamide and the second monomer comprises DADMAC, wherein the percent ratio of the first and second monomers ranges from about 30:70 to about 70:30.

In some embodiments either or both the first and the second base polymer comprise copolymers of a first monomer comprising acrylamide or methacrylamide and a second monomer comprising DADMAC (dimethyldiallylammonium chloride) or Q9, optionally wherein the first monomer comprises acrylamide and the second monomer comprises DADMAC, wherein the percent ratio of the first and second monomers ranges from about 40:60 to about 60:40, or is about 40:60.

In some embodiments in the glyoxalation reaction used to produce the glyoxalated first and the second base polymer, the glyoxal base polymer ratio ranges from 10:90 to 90:10, 20:80 to 80:20, 30:70 to 70:30, or comprises about 30:70.

In some embodiments the ratio of the first and second base polymer ranges from 20:80 to 80:20, 30:70 to 70:30, or 40:60 to 60:40.

In some embodiments either or both the first and the second base polymer comprise copolymers of acrylamide and DADMAC (dimethyldiallylammonium chloride), the percent ratio of the acrylamide and DADMAC monomers therein ranges from about 40:60 to about 60:40; and the ratio of the first and second base polymer in the strengthening agent ranges from 20:80 to 80:20, 30:70 to 70:30, or 40:60 to 60:40.

In some embodiments both the first and the second base polymer comprise copolymers of acrylamide and DADMAC, the weight average molecular weight of the first base polymer ranges from no more than 2 to 25 kDa, 5-20 kDa, or 5-15 kDa; the weight average molecular weight of the second base polymer ranges from at least 100 kDa to 500 kDa, 150-400 kDa, 200-300 kDa, 225 kDa to 275 kDa or is about 250 kDa; and the ratio of the first and second base polymer ranges from 20:80 to 80:20, 30:70 to 70:30, or 40:60 to 60:40.

In some embodiments, the GPAM content of the cationic GPAM composition may be from about 2% to about 20%, optionally from about 3% to about 10%, further optionally from about 4% to about 8%, further optionally from about 5% to about 7%. In some embodiments, the GPAM content of the first base polymer may be from about 2% to about 20%, optionally from about 3% to about 10%, further optionally from about 4% to about 8%, further optionally from about 5% to about 7%. In some embodiments, the GPAM content of the second base polymer may be from about 2% to about 20%, optionally from about 3% to about 10%, further optionally from about 4% to about 8%, further optionally from about 5% to about 7%.

In some embodiments, the first base polymer may comprise a cationic charge of at least 5% by weight, at least 10% by weight, at least 15% by weight, at least 20% by weight, at least 25% by weight, at least 30% by weight, at least 35% by weight, at least 40% by weight, at least 50% by weight, or at least 60% by weight, wherein optionally the first base polymer is amphoteric. In some embodiments, the second base polymer may comprise a cationic charge of at least 5% by weight, at least 10% by weight, at least 15% by weight, at least 20% by weight, at least 25% by weight, at least 30% by weight, at least 35% by weight, at least 40% by weight, at least 50% by weight, or at least 60% by weight, wherein optionally the second base polymer is amphoteric.

In some embodiments, the first base polymer may comprise a cationic monomer percentage of at least 5% by weight, at least 10% by weight, at least 15% by weight, at least 20% by weight, at least 25% by weight, at least 30% by weight, at least 35% by weight, at least 40% by weight, at least 50% by weight, or at least 60% by weight, wherein optionally the first base polymer may be amphoteric. In some embodiments, the second base polymer may comprise a cationic monomer percentage of at least 5% by weight, at least 10% by weight, at least 15% by weight, at least 20% by weight, at least 25% by weight, at least 30% by weight, at least 35% by weight, at least 40% by weight, at least 50% by weight, or at least 60% by weight, wherein optionally the second base polymer may be amphoteric.

In some embodiments, the cationic GPAM composition may comprise a solids weight percentage of about 1.0% or more, 2.0% or more, 3.0% or more, 4.0% or more, 5.0% or more, 5.5% or more, 6.0% or more, 6.5% or more, 7.0% or more, 7.5% or more, 8.0% or more, 8.5% or more, 9.0% or more, 9.5% or more, 10.0% or more, 10.5% or more, 11.0% or more, or 11.5% or more. In some embodiments, the cationic GPAM composition may comprise a solids weight percentage of from about 1.0% to about 20.0%, optionally from about 3.0% to about 15%.

In some embodiments, the cationic GPAM composition may comprise a glyoxal to total base polymer weight ratio of at least about 1:99, at least about 2.5:97.5, at least about 5:95, at least about 7.5:92.5, at least about 10:90, at least about 12.5:87.5, at least about 15:85, at least about 17.5: 82.5, at least about 20:80, at least about 22.5:77.5, at least about 25:75, at least about 27.5:72.5, at least about 29:71, or at least about 30:70.

In some embodiments, the first base polymer may comprise an acrylamide-based polymer. In some embodiments, the second base polymer may comprise an acrylamide-based polymer. In some embodiments, the first base polymer may comprise one or more cationic monomers. In some embodiments, the second base polymer may comprise one or more cationic monomers. A skilled artisan will be able to easily determine an appropriate cationic monomer:acrylamide weight ratio for the first base polymer and/or the second base polymer. For example, in some embodiments, the first base polymer may comprise a cationic monomer:acrylamide weight ratio of from about 15:85 to about 60:40, optionally from about 20:80 to about 55:45, further optionally from about 25:75 to about 50:50. For example, in some embodiments, the second base polymer may comprise a cationic monomer:acrylamide weight ratio of from about 15:85 to about 60:40, optionally from about 20:80 to about 55:45, further optionally from about 25:75 to about 50:50. In some embodiments, the first base polymer is amphoteric and comprises more cationic monomers than anionic monomers. In some embodiments, the second base polymer is amphoteric and comprises more cationic monomers than anionic monomers. In some embodiments, the first base polymer may comprise a copolymer of acrylamide or methacrylamide and one or more cationic monomers. In some embodiments, the second base polymer may comprise a copolymer of acrylamide or methacrylamide and one or more cationic monomers.

In some embodiments, viscosity of the cationic GPAM composition may be about 10 cPs or more, about 15 cPs or more, about 20 cPs or more, about 25 cPs or more, about 30 cPs or more, or about 35 cPs or more, for example as measured by a LV Brookfield viscometer at 25° C. and 600 rpm using spindle number 1.

In some embodiments, the cationic monomer of the first and second base polymers of the cationic GPAM composition may comprise any one or more of the cationic monomers described herein. In some embodiments, the one or more cationic monomers may each be selected from the group consisting of acryloyloxy ethyl trimethyl ammonium chloride ("AETAC"), methacryloyloxyethyltrimethylammonium chloride, methacrylamidopropyltrimethylammonium chloride ("MAPTAC"), acrylamidopropyltrimethylammonium chloride, methacryloyloxy ethyldimethylammonium sulfate, dimethylaminoethyl acrylate, dimethylaminopropyl methacrylamide, methacryloyloxyethyltrimethylammonium chloride dimethylaminoethyl methacrylate sulfate, diallyldimethylammonium chloride ("DADMAC"); dialkylaminoalkyl acrylates and methacrylates and their quaternary or acid salts, including, but not limited to, dimethylaminoethyl acrylate methyl chloride quaternary salt ("DMAEA.MCQ"), dimethylaminoethyl acrylate methyl sulfate quaternary salt ("DMAEM.MCQ"), dimethyaminoethyl acrylate benzyl chloride quaternary salt ("DMAEA.BCQ"), dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate and diallyldialkylammonium halides such as diallyldiethylammonium chloride and diallyldimethyl ammonium chloride. In some embodiments, the one or more cationic monomers may comprise DADMAC. In some embodiments, the one or more cationic monomers may comprise acryloyloxyethyltrimethyl ammonium chloride ("Q9"). In some embodiments, the one or more cationic monomers may each comprise DADMAC and/or acryloyloxyethyltrimethyl ammonium chloride ("Q9"). In some embodiments, the one or more cationic monomers may each be selected from the group consisting of methacryloyloxyethyltrimethyl ammonium chloride, acryloyloxyethyltrimethyl ammonium chloride (aka Q9), 3-(methacrylamido)propyltrimethyl ammonium chloride, 3-(acryloylamido)propyltrimethyl ammonium chloride, diallyldimethyl ammonium chloride (DADMAC), dimethylaminoethyl acrylate, dimethylaminoethyl methacrylate, and dimethylaminopropyl acrylamide, dimethylaminopropylmethacrylamide.

In some embodiments, the acrylamide-based polymer of the first and second base polymers may each comprise one or more primary amide-containing monomers. In some embodiments, the acrylamide-based polymer may comprise one or more monomers selected from the group consisting of acrylamide, methacrylamide, ethylacrylamide, crotonamide, N-methyl acrylamide, N-butyl acrylamide, N-ethyl methacrylamide, and any combination thereof. In some embodiments, the acrylamide-based polymer may comprise one or more acrylamide monomers.

The properties of such cationic GPAM compositions, such as the cationic charge, the cationic monomer percentage, the solids percentage, the GPAM content, and/or the glyoxalation percentage, as compared to conventional GPAMs, demonstrate desirable and effective end-use performance, and the properties of the cationic GPAMs disclosed and exemplified herein should translate into huge reductions in product volumes needing to be transported and handled, such as, for example, where railway tanker car or tanker truck shipments and the like are involved, and thus significant savings in costs and handling can be obtained using the subject cationic GPAMs.

In some embodiments, the cationic polyacrylamide of the cationic GPAM, that is, of the first base polymer and/or of the second base polymer, may comprise a cationic copolymer of acrylamide or methacrylamide (cPAM). In some embodiments, the cPAM may comprise a cationic copolymer of acrylamide or methacrylamide that may be produced by copolymerizing acrylamide or methacrylamide with one or more cationic monomer(s). In some embodiments, said one or more cationic monomers may comprise any one or more of the cationic monomers discussed herein. In some embodiments, said one or more cationic monomers may include, but are not limited to including, methacryloyloxyethyltrimethyl ammonium chloride, acryloyloxyethyltrimethyl ammonium chloride (aka Q9), 3-(methacrylamido)propyltrimethyl ammonium chloride, 3-(acryloylamido)propyltrimethyl ammonium chloride, diallyldimethyl ammonium chloride (DADMAC), dimethylaminoethyl acrylate, dimethylaminoethyl methacrylate, dimethylaminopropylacrylamide, dimethylaminopropylmethacrylamide, and similar monomers. In some embodiments, the cationic GPAM may comprise a cationic monomer comprising any one or more of 2-vinylpyridine, 2-vinyl-N-methylpyridinium chloride, (p-vinylphenyl)trimethyl ammonium chloride, diallyldimethylammonium chloride, 2-(dimethylamino)ethyl acrylate, trimethyl p-vinylbenzyl)ammonium chloride, p-dimethylaminoethylstyrene, dimethylaminopropyl acrylamide, 2-methylacroyloxyethyltrimethyl ammonium methylsulfate, or 3-acrylamido-3-methylbutyl trimethyl ammonium chloride, or any combination thereof. In some embodiments, the cPAM may comprise a copolymer of acrylamide or methacrylamide and DADMAC. In some embodiments, the cPAM may comprise a copolymer of acrylamide or methacrylamide and Q9. In some embodiments, a cPAM may comprise one or more cationic monomers, such as those discussed herein, a net charge that is cationic, and an acrylamide or methacrylamide backbone. In some embodiments, a cPAM may comprise an acrylamide or methacrylamide based polymer that is treated after the polymerization to render it cationic, for example, by using Hofmann or Mannich reactions. In some embodiments, a cPAM may comprise a cationic copolymer of acrylamide or methacrylamide that may be prepared by conventional radical-initiation polymerization methods.

In some embodiments, the back bone polymer, e.g., the back bone of the first base polymer and/or the back bone of the second base polymer, may comprise an acrylamide-based polymer, wherein the acrylamide monomer is replaced by other primary amide-containing monomers such as methacrylamide, ethylacrylamide, crotonamide, N-methyl acrylamide, N-butyl acrylamide, or N-ethyl methacrylamide, or any combination thereof. In some embodiments, the back bone polymer may comprise acrylamide monomers. In some embodiments, the one or more cationic monomers may be selected from the group consisting of acryloyloxy ethyl trimethyl ammonium chloride ("AETAC"), methacryloyloxyethyltrimethylammonium chloride, methacrylamidopropyltrimethylammonium chloride ("MAPTAC"), acrylamidopropyltrimethylammonium chloride, methacryloyloxyethyldimethylammonium sulfate, dimethylaminoethyl acrylate, dimethylaminopropylmethacrylamide, methacryloyloxyethyltrimethylammonium chloride dimethylaminoethyl methacrylate sulfate, diallyldimethylammonium chloride ("DADMAC"); dialkylaminoalkyl acrylates and methacrylates and their quaternary or acid salts, including, but not limited to, dimethylaminoethyl acrylate methyl chloride quaternary salt ("DMAEA.MCQ"), dimethylaminoethyl acrylate methyl sulfate quaternary salt ("DMAEM.MCQ"), dimethyaminoethyl acrylate benzyl chloride quaternary salt ("DMAEA.BCQ"), dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate and diallyldialkylammonium halides such as diallyldiethylammonium chloride and diallyldimethyl ammonium chloride. In exemplary embodiments the first or second base polymers comprise or consist of (i) a first monomer comprising acrylamide and/or methacrylamide; and (ii) a second monomer comprising DADMAC or Q9 monomers, and wherein optionally the percent ratio of the first and second monomers ranges from about 30:70 from about 70:30 or 40:60 to about 60:40.

II. Methods of Using Cationic GPAM Compositions

Based on the foregoing, the present disclosure further generally relates to a method of papermaking, wherein said method comprises adding one or more cationic GPAM compositions as afore-described, which, based on their composition are useful in papermaking processes, and which moreover possess storage properties that should result in reduced shipping costs; which method generally comprises the addition of one or more of such cationic GPAM compositions during a papermaking method in an amount effective to increase the wet and/or dry strength of the paper. In some embodiments, the one or more cationic GPAM compositions is added to a composition comprising fiber and/or pulp used in the method prior to the paper product being formed. In some embodiments, the one or more cationic GPAM compositions is added to one or more surfaces of the paper product after the paper product is formed. In some embodiments, the cationic GPAM composition may comprise any one or more of the cationic GPAM compositions disclosed herein. In some embodiments, the cationic GPAM composition may comprise a first base polymer having a weight average molecular weight of less than 30,000 Da, a second base polymer having a weight average molecular weight of at least 30,000 Da, optionally wherein the first base polymer and the second base polymer comprise or consist of (i) a first monomer comprising acrylamide and/or methacrylamide; and (ii) a second monomer comprising DADMAC or Q9 monomers, further optionally wherein the first base polymer and the second base polymer have a weight ratio from about 10:90 to about 90:10, optionally from about 20:80 to about 80:20, further optionally from about 30:70 to about 70:30 or from about 40:60 to about 60:40, and wherein the first base polymer and the second base polymer are each glyoxalated.

In some embodiments, the cationic GPAM compositions described herein provide thermosetting resins that are particularly suitable for use as additives in papermaking methods, i.e., wherein the addition of said cationic GPAM compositions results in papers with desirable dry and temporary wet strength, and/or increases the papermaking dewatering rate.

Moreover, the present disclosure further relates to paper products comprising one or more improved GPAM compositions as disclosed herein. In some embodiments, the paper product may comprise at least one paper layer or web containing the cationic GPAM composition, for example, paper sheeting, paperboard, tissue paper, and wall board. In some embodiments, the paper product comprises the cationic GPAM composition on at least one surface of the paper product. The cationic GPAM composition is not limited to use in any particular type of paper or papermaking method and should find application in Kraft paper, sulfite paper, semi-chemical paper, and the like, including paper produced using bleached pulp, unbleached pulp, or combinations thereof.

When using a cationic GPAM composition as disclosed herein during a papermaking method, the cationic GPAM composition can be added at any time before, during and/or after paper formation. In some instances, the cationic GPAM composition may be added at the wet end of a paper-making facility to the cellulose fiber suspensions, generally at a point when wet strength resins are conventionally added. In some embodiments, the cationic GPAM composition can be added to a previously prepared paper, e.g., to one or more surfaces of a previously prepared paper, by padding, spraying, immersing, and/or printing and the like. Moreover, in some embodiments, the cationic GPAM composition may be added to paper pulp over a wide range of pH values, such as from about 4 to about 9.

In some instances, the amount of cationic GPAM composition added during a papermaking method may range from about 0.02% by dry weight to about 10% by dry weight of the cellulose fibers, e.g., in the range of about 0.05 wt % to 5 wt % of the dry paper weight.

Still further, the present disclosure generally relates to a paper product, e.g., a handsheet, comprising one or more cationic GPAMs, e.g., cationic GPAMs as afore-described, which, based on their composition are useful in papermaking processes and which optionally possess storage properties that should result in reduced shipping costs. In some embodiments, the paper product may comprise fiber-based products, e.g., handsheets, board-based products, beverage carriers, toweling, milk and juice cartons, food trays, paper bags, liner board for corrugated containers, packaging board grade, and tissue and towel grade, paper materials, paper towels, diapers, sanitary napkins, training pants, pantiliners, incontinence briefs, tampons, pee pads, litter box liners, coffee filters, air filters, dryer pads, floor cleaning pads, absorbent facial tissue, absorbent bathroom tissue, napkins, wrapping paper, and/or other paperboard products such as cartons and bag paper. In some embodiments, the paper product may comprise cellulose paperboard webs which comprise: (a) predominantly cellulose fibers and (b) one or more cationic GPAM compositions.

In some embodiments, the paper product may comprise an improved paper strength, e.g. as determined by STFI testing, compared to a paper product that does not comprise a cationic GPAM composition. For example, in some embodiments, the paper product may comprise a handsheet comprising one or more cationic GPAM compositions, wherein said handsheet may comprise an STFI value improvement of 6% or more, 7% or more, 8% or more, 9% or more, 10% or more, 12.5% or more, 15.0% or more, 17.5% or more, 20.0% or more, 22.5% or more, 25.0% or more at either 4.5 lbs/ton, 5.0 lbs/ton, 9.0 lbs/ton or 10 lbs/ton testing as compared to the blank sample used for the STFI test.

In some embodiments, the paper product may comprise an improved paper strength, e.g., as determined by burst strength testing, compared to a paper product that does not comprise a cationic GPAM composition. For example, in some embodiments, a handsheet comprising one or more cationic GPAM compositions may comprise a burst strength value improvement of 6% or more, 7% or more, 8% or more, 9% or more, 10% or more, 12.5% or more, 15.0% or more, 17.5% or more, 20.0% or more, 22.5% or more, 25.0% or more, 27.5% or more, 30.0% or more, 32.5% or more, 35.0% or more, 37.5% or more, or 40% or more at either 4.5 lbs/ton, 5.0 lbs/ton, 9.0 lbs/ton or 10 lbs/ton testing as compared to the blank sample used for the burst strength test.

In some embodiments, the cation GPAM compositions may decrease a drainage time of a treated sample compared to a drainage time without use of the cationic GPAM composition. For example, in some embodiments, cationic GPAM compositions may effect efficient drainage, e.g., drainage of OCC pulp, such as demonstrating an improvement in drainage time, e.g., time to collect a given amount of filtrate from OCC pulp, of 25.0% or more, 30.0% or more, 35.0% or more, 40.0% or more, 45.0% or more, 50.0% or more, 55.0% or more as compared to the drainage without the use of a cationic GPAM composition. In some embodiments, the cationic GPAM composition increases a drainage rate of a treated sample resulting in an increased paper production rate as compared to a drainage rate without use of the cationic GPAM composition. In some embodiments, the cationic GPAM composition improves drying energy savings of the paper-making method. Furthermore, cationic GPAM compositions may effect a decrease in the total amount of solids present in a treated sample, e.g., a decrease in the total solids present in a filtrate collected from OCC pulp treated with a cationic GPAM composition, e.g., a decrease in the solid content of white water from tray or silo post sheet forming, such as an improvement (decrease in solids content) of 15% or more, 17.5% or more, 20.0% or more, 22.5% or more, 25.0% or more, 27.5% or more, 30.0% or more, or 32.5% or more as compared to the total amount of solids present in a sample without the use of a cationic GPAM composition. In some embodiments, the cationic GPAM composition may improve drying energy savings.

Moreover, the present disclosure generally relates to a method of making a handsheet, said method comprising: a. providing a pulp stock; b. diluting the pulp stock; c. adding one or more salts to a desired level of conductivity; d. adjusting the pH to a desired value; e. adding one or more cationic GPAM compositions; f. adding the treated pulp to a dynamic sheet former; g. pressing the sheets resulting from f.; h. drying the sheets; and i. conditioning the sheets.

Furthermore, the present disclosure generally relates to a method of manufacturing one or more paper products, wherein said method comprises: a. providing a composition comprising predominantly cellulose fibers; b. adding a predetermined quantity of one or more cationic GPAM compositions; and c. forming the desired paper product.

Moreover, the present disclosure generally encompass a method of manufacturing one or more paper products, e.g., one or more adsorbent paper products, wherein said method comprises: a. providing a composition comprising any of softwood fiber, hardwood fiber, recycle fiber, refined fiber, or a mixture of any of the foregoing in an amount sufficient to form an overall furnish of from approximately 1 to 100% hardwood fiber, softwood fiber, recycle fiber, refined fiber or a mixture of any of the foregoing; (b) adding a predetermined quantity of one or more cationic GPAM compositions as discussed herein; and (c) forming a paper product by drying via one or more drying means to a desired moisture content level.

Additionally, the present disclosure generally relates to a method for strengthening paper, comprising (i) contacting pulp fibers with a strengthening resin comprising at least one cationic GPAM composition, e.g., at least one of the improved cationic GPAM compositions disclosed herein, which GPAM compositions possess specific attributes which render them well suited for use in papermaking processes, and (ii) at least partially curing the strengthening resin comprising at least one cationic GPAM composition in the mixture of pulp fibers and cationic GPAM composition to produce a paper product of enhanced strength.

III. Methods of Preparing Cationic GPAM Compositions

The present disclosure also generally relates to a method for preparing the cationic GPAM compositions disclosed herein, particularly the cationic GPAM composition comprising a first base polymer having a weight average molecular weight of less than 30,000 Da, optionally from 2 to 25 kDa, or 5 to 15 kDa, and a second base polymer having a weight average molecular weight of at least 30,000 Da; optionally a weight average molecular weight at least 50 kDa or a weight average molecular weight ranging from 100 kDa to 500 kDa, 150-400 kDa, 200-300 kDa, 225 kDa to 275 kDa or about 250 kDa; further optionally wherein the first base polymer and/or the second base polymer comprise (i) acrylamide or methacrylamide monomers and (ii) DADMAC or Q9 monomers, wherein the first base polymer and the second base polymer have a weight ratio from about 10:90 to about 90:10, optionally from about 20:80 to about 80:20, further optionally from about 30:70 to about 70:30 or from about 40:60 to about 60:40; wherein the first base polymer and the second base polymer are each glyoxalated; and wherein optionally the cationic GPAM composition requires a reduced volume of an aqueous carrier for storage or transport compared to a volume of an aqueous carrier needed for conventional GPAMs used in papermaking.

In some embodiments, the method for preparing a cationic GPAM composition disclosed herein may comprise a. glyoxalating the first base polymer in a first glyoxalation reaction comprising glyoxal to produce a first glyoxalated base polymer; b. glyoxalating the second base polymer in a second glyoxalation reaction comprising glyoxal to produce a second glyoxalated base polymer; and c. combining the first glyoxalated base polymer and the second glyoxalated base polymer to produce the cationic GPAM composition; wherein steps (a) and (b) may be performed in any order or simultaneously.

In some embodiments, the method for preparing a cationic GPAM composition disclosed herein may comprise a. combining the first base polymer and the second base polymer; and b. glyoxalating the combination of the first base polymer and the second base polymer in a glyoxalation reaction comprising glyoxal to produce the cationic GPAM composition.

In some embodiments, the method for preparing a cationic GPAM composition disclosed herein may comprise a. glyoxalating the first base polymer in a glyoxalation reaction comprising glyoxal to produce a first glyoxalated base polymer; and b. adding the second base polymer and optionally additional glyoxal to the glyoxalation reaction to produce the cationic GPAM composition.

In some embodiments, the method for preparing a cationic GPAM composition disclosed herein may comprise a. glyoxalating the second base polymer in a glyoxalation reaction comprising glyoxal to produce a second glyoxalated base polymer; and b. adding the first base polymer and optionally additional glyoxal to the glyoxalation reaction to produce the cationic GPAM composition.

In some embodiments, the method for preparing a cationic GPAM composition disclosed herein may comprise a. glyoxalating the first base polymer in a first glyoxalation reaction comprising glyoxal to produce a first glyoxalated base polymer; and b. glyoxalating the second base polymer in a second glyoxalation reaction comprising glyoxal and the first glyoxalated base polymer to produce the cationic GPAM composition.

In some embodiments, the method for preparing a cationic GPAM composition disclosed herein may comprise a. glyoxalating the second base polymer in a second glyoxalation reaction comprising glyoxal to produce a second glyoxalated base polymer; and b. glyoxalating the first base polymer in a first glyoxalation reaction comprising glyoxal and the second glyoxalated base polymer to produce the cationic GPAM composition.

The compositions and methods illustratively disclosed herein suitably may be practiced in the absence of any element which is not specifically disclosed herein and/or any element specifically disclosed herein.

EXAMPLES

Example 1: Sample and Handsheet Preparation

The cationic GPAM compositions and the handsheets used in the following examples were prepared as follows. All GPAM samples were prepared by reacting glyoxal with the cationic polyacrylamide base polymers shown in Table 1.

TABLE 1

BASE POLYMER COMPOSITIONS

| Samples | Base Polymer MW (kilo Dalton) | Base Polymer charge % (wt %) |
|---|---|---|
| Base Polymer 1* | 8 | 40% |
| Base Polymer 2 | 15 | 10% |
| Base Polymer 3 | 246 | 40% |

*Each of Base Polymer 1, 2 and 3 are copolymers consisting of acrylamide and DADMAC (dimethyldiallylammonium chloride) monomers.
Cationic copolymers comprising acrylamide and DADMAC monomers were used in the examples herein because such copolymers are widely used as a "model" cationic polymer. Accordingly, it is reasonably expected that the results obtained using these copolymers will be obtained with other cationic polymers such as cationic copolymers comprising other cationic monomers which are disclosed herein.

Compositions of the GPAM samples prepared by reacting glyoxal with the base polymers of Table 1 are described in Table 2. For each reaction, the glyoxal:base polymer ratio was 29:71.

TABLE 2

GPAM SAMPLE COMPOSITIONS

| Samples | Preparation Method | Solids |
|---|---|---|
| GPAM 1 | Glyoxalation of Base Polymer 1. | 14% |
| GPAM 2 | Glyoxalation of Base Polymer 3. | 5% |
| GPAM 3 | Glyoxalation of a 20:80 blend of Base Polymer 1:Base Polymer 3. | 6.1% |
| GPAM 4 | Glyoxalation of a 30:70 blend of Base Polymer 1:Base Polymer 3. | 7.3% |
| GPAM 5 | A 25:75 Blend of GPAM 1:GPAM 2. | 6.0% |
| GPAM 6 | A 33:67 Blend of GPAM 1:GPAM 2. | 6.4% |
| GPAM 7 | Carried out Base Polymer 3 glyoxalation rxn in the presence of GPAM 1. The Base Polymer 1:Base Polymer 3 ratio was 25:75. | 6.0% |
| GPAM 8 | Glyoxalation of Base Polymer 2. | 7.0% |

TABLE 2-continued

GPAM SAMPLE COMPOSITIONS

| Samples | Preparation Method | Solids |
|---|---|---|
| GPAM 9 | Glyoxalation of a 25:75 blend of Base Polymer 2:Base Polymer 3. | 7.0% |
| GPAM 10 | Glyoxalation of a 40:60 blend of Base Polymer 2:Base Polymer 3. | 6.7% |
| GPAM 11 | Glyoxalation of a 60:40 blend of Base Polymer 2:Base Polymer 3. | 7.2% |

GPAM 1, GPAM 2, and GPAM 8 are conventional GPAM compositions. GPAM 1 was prepared using the low molecular weight (8 kDa) Base Polymer 1 and has a high final solid content (14%) whereas GPAM 2 was prepared using the high molecular weight (246 kDa) Base Polymer 3 and has a low final solid content (5%). GPAM 8 was prepared using the low molecular weight (15 kDa) Base Polymer 2.

New GPAM compositions 3 to 7 were prepared with both Base Polymers 1 and 3 by various methods. GPAM 3 and GPAM 4 were prepared by glyoxalation of base polymer blends. GPAM 5 and GPAM 6 were simple blends of GPAM 1 and GPAM 2. GPAM 7 was prepared by a two-step reaction. In the $1^{st}$ step, GPAM 1 was produced by glyoxalation of Base Polymer 1. In the $2^{nd}$ step, Base Polymer 3 and more glyoxal were added to the finished GPAM 1 and further glyoxalation reaction was carried out to produce the final GPAM 7 composition.

New GPAMs 3-7 had considerably higher solid contents than that of GPAM 2 (5.0%) prepared from Base Polymer 3. For example, GPAM 4 had a solid content of 7.3%, which was 46% higher than that of GPAM 2. When GPAM products are produced with a solid content below 6%, the cost associated with production, shipping, and handling is often higher than the raw material cost. As a result, a 45% increase of product solid content resulted in a significant reduction of product total cost.

New GPAMs 9-11 were prepared by carrying out glyoxalation reaction of a blended mixture of Basepolymer 2 and Basepolymer 3. The ratio of Base Polymer 2:Base Polymer 3 was as indicated in Table 2. As shown in Table 2, GPAMs 9, 10, and 11 have solid content of 7.0%, 6.7%, and 7.2%, respectively, which are each significantly higher than that of GPAM 2 (5.0%) prepared from Base Polymer 3, resulting in a significant reduction of product total cost.

Handsheets were prepared using the above GPAMs as follows: OCC pulp thick stock was obtained from a recycled liner board paper mill. First, the thick stock was dilated to 0.5% consistency using tap water. NaCl was added to the diluted pulp to match mill white water conductivity. 1 M HCl solution was then added to the pulp to adjust pH to 6.4. Second, GPAM compositions were introduced to the diluted pulp under overhead agitation. The treated pulp was then added to the dynamic sheet former (DSF) (TECHPAP France, type—FDA) to produce 110 gsm sheet. Next, formed sheets are pressed with blotting paper at 15 psi using a pneumatic roll press and then dried on a rotary dryer at 110° C. Then, dry paper sheets were oven (forced air conventional oven) cured at 105° C. for 5 minutes, then conditioned in the standard TAPPI control room for overnight. Last, paper strips were cut along cross direction.

Example 2: Burst Strength Testing

Burst strength testing was carried out according to TAPPI standard method T-403. Results are shown in Table 3.

TABLE 3

BURST STRENGTH OF HANDSHEETS TREATED WITH VARIOUS GPAM PRODUCTS

| Samples | 5 lb/ton Burst | Improvement | 10 lb/ton Burst | Improvement |
|---|---|---|---|---|
| Blank | 35.2 | NA | 35.2 | NA |
| GPAM 1 | 40.8 | 16.0% | 44.0 | 25.1% |
| GPAM 2 | 43.1 | 22.7% | 48.4 | 37.6% |
| GPAM 3 | 43.5 | 23.7% | 48.2 | 37.1% |
| GPAM 4 | 43.2 | 22.9% | 48.1 | 36.8% |

As shown in Table 3, each of the new GPAM 3 and GPAM 4 provided comparable dry strength performance as GPAM 2. In addition, those new GPAM products had considerably higher solid contents than GPAM 2.

Example 3: STFI Testing

STFI testing was carried out according to TAPPI standard method T-826. Results are shown in Table 4 and Table 5.

TABLE 4

STFI STRENGTH OF HANDSHEETS TREATED WITH VARIOUS GPAM PRODUCTS

| Samples | 9 lb/ton STFI | Improvement |
|---|---|---|
| Blank | 8.64 | NA |
| GPAM 1 | 10.01 | 15.9% |
| GPAM 2 | 10.61 | 22.8% |
| GPAM 5 | 10.56 | 22.2% |
| GPAM 6 | 10.53 | 21.9% |
| GPAM 7 | 10.65 | 23.3% |

TABLE 5

STFI STRENGTH OF HANDSHEETS TREATED WITH VARIOUS GPAM PRODUCTS

| Samples | 4.5 lb/ton STFI | Improvement |
|---|---|---|
| Blank | 8.54 | NA |
| GPAM 2 | 9.25 | 8.3% |
| GPAM 8 | 8.84 | 3.5% |
| GPAM 9 | 9.29 | 8.8% |
| GPAM 10 | 9.60 | 12.4% |
| GPAM 11 | 9.77 | 14.4% |

As shown in Table 4, each of the new GPAM 5, GPAM 6, and GPAM 7 provided comparable dry strength performance as GPAM 2. In addition, as discussed above, those new GPAM products had considerably higher solid contents than GPAM 2.

Table 5 presents STFI results for handsheets treated with conventional GPAM 2 and GPAM 8 prepared from Base Polymer 3 and Base Polymer 2, respectively, as well as with new GPAM compositions 9-11. Conventional GPAM 2 and GPAM 8 increased STFI by 8.3% and 3.5%, respectively. In comparison, new GPAM 9 to 11 increased STFI by 8.8%, 12.4%, and 14.4%, respectively. This study demonstrated clearly that new GPAM compositions prepared with the blend of Basepolymer 2 and Basepolymer 3 can provide comparable or considerably greater paper strength enhancement over conventional GPAMs prepared with either Basepolymer 2 or Basepolymer 3 alone.

In the preceding procedures, various steps have been described. It will, however, be evident that various modifications and changes may be made thereto, and additional procedures may be implemented, without departing from the broader scope of the exemplary procedures as set forth in the claims that follow.

What is claimed is:

1. A cationic glyoxalated polyacrylamide ("GPAM") composition suitable for use as a dry and/or wet strengthening agent, wherein said cationic GPAM composition comprises:
    i. a first base polymer having a weight average molecular weight in the range of 2 to 30 kDa; and
    ii. a second base polymer having a weight average molecular weight in the range of 50 to 1500 kDa;
    wherein the weight ratio of the first base polymer to the second base polymer ranges from about 10:90 to about 90:10;
    wherein the first base polymer is glyoxalated and the second base polymer is glyoxalated, wherein the first base polymer and the second base polymer do not comprise a primary amine functional group.

2. The cationic GPAM of claim 1, wherein the cationic GPAM composition is capable of being stored and/or transported in a reduced volume of an aqueous carrier compared to a volume of an aqueous carrier needed for storage and/or transport of conventional GPAMs used in papermaking.

3. The cationic GPAM of claim 1, wherein:
    i. the weight average molecular weight of the first base polymer is from 4 kDa to 25 kDa;
    ii. the weight average molecular weight of the second base polymer is from at least 60 kDa to 1500 kDa;
    iii. the glyoxalation percentage of the cationic GPAM composition is from about 2% to about 90%;
    iv. the glyoxalation percentage of the first base polymer is from about 2% to about 90%;
    v. the glyoxalation percentage of the second base polymer is from about 2% to about 90%;
    vi. the GPAM content of the cationic GPAM composition is from about 2% to about 20%;
    vii. the GPAM content of the first base polymer is from about 2% to about 20%;
    viii. the GPAM content of the second base polymer is from about 2% to about 20%;
    ix the first base polymer comprises a cationic monomer percentage of at least 5% by weight, at least 10% by weight, at least 15% by weight, at least 20% by weight, at least 25% by weight, at least 30% by weight, at least 35% by weight, at least 40% by weight, at least 50% by weight, or at least 60% by weight;
    x. the second base polymer comprises a cationic monomer percentage of at least 5% by weight, at least 10% by weight, at least 15% by weight, at least 20% by weight, at least 25% by weight, at least 30% by weight, at least 35% by weight, at least 40% by weight, at least 50% by weight, or at least 60% by weight;
    xi. the cationic GPAM composition comprises a solids weight percentage of about 1.0% or more;
    xii. the cationic GPAM composition comprises a solids weight percentage of from about 1.0% to about 20.0%;
    xiii. the cationic GPAM composition comprises a glyoxal to total base polymer weight ratio from at least about 1:99 to at least about 30:70;
    xiv. the first base polymer comprises an acrylamide-based polymer;
    xv. the second base polymer comprises an acrylamide-based polymer;
    xvi. the first base polymer comprises one or more cationic monomers;

xvii. the second base polymer comprises one or more cationic monomers;
xviii. the first base polymer is amphoteric and comprises more cationic monomers than anionic monomers;
xix. the second base polymer is amphoteric and comprises more cationic monomers than anionic monomers;
xx. the first base polymer comprises a copolymer of acrylamide or methacrylamide and one or more cationic monomers;
xxi. the first base polymer and/or second base polymer comprises acryloyloxyethyltrimethyl ammonium chloride or dimethyldiallylammonium chloride (DADMAC) monomers;
xxii. the second base polymer comprises a copolymer of acrylamide or methacrylamide and one or more cationic monomers;
xxiii. the first base polymer and the second base polymer comprises a copolymer of acrylamide or methacrylamide monomers and one or more cationic monomers;
xxiv. the first base polymer and/or the second base polymer comprises a copolymer of (a) acrylamide and/or methacrylamide monomers and acryloyloxyethyltrimethyl ammonium chloride and/or (b) dimethyldiallylammonium chloride (DADMAC) monomers;
xxv. the first base polymer or the second base polymer comprises a copolymer of acrylamide and dimethyldiallylammonium chloride (DADMAC) monomers;
xxvi. the first base polymer and the second base polymer comprise a copolymer of acrylamide and dimethyldiallylammonium chloride (DADMAC) monomers;
xxvii. the first base polymer and the second base polymer comprise a copolymer of acrylamide and dimethyldiallylammonium chloride (DADMAC) monomers and the glyoxal:base polymer ratio for the glyoxalation reaction ranges from about 10:90 to 90:10;
xxviii. the first base polymer and the second base polymer comprise a copolymer of acrylamide and dimethyldiallylammonium chloride (DADMAC) monomers; the molecular weight of the first base polymer is no more than 25 kDa to 250 kDa and the molecular weight of the second base polymer is at least 50 kDa;
xxix. the first base polymer and the second base polymer comprise a copolymer of acrylamide and dimethyldiallylammonium chloride (DADMAC) monomers; the molecular weight of the first base polymer is no more than 5 kDa to 25 kDa and the molecular weight of the second base polymer is at least 50 kDa to 250 kDa; and the glyoxal:base polymer ratio for the glyoxalation reaction used to glyoxylate the first and/or second base polymer ranges from about 10:90 to 90:10;
xxx. the first base polymer and the second base polymer comprise a copolymer of acrylamide and dimethyldiallylammonium chloride (DADMAC) monomers; the molecular weight of the first base polymer is no more than 5 kDa to 25 kDa and the molecular weight of the second base polymer is at least 50 kDa to 250 kDa; the glyoxal:base polymer ratio for the glyoxalation reaction of the first and/or second base polymer ranges from about 10:90 to 90:10; and the weight ratio of the first base polymer to the second base polymer ranges from about 10:90 to about 90:10;
xxxi. the first base polymer and the second base polymer comprise a copolymer of acrylamide and dimethyldiallylammonium chloride (DADMAC); the molecular weight of the first base polymer is no more than 5 kDa to 25 kDa and the molecular weight of the second base polymer is at least 50 kDa to 250 kDa; the glyoxal:base polymer ratio for the glyoxalation reaction of the first and/or second base polymer ranges from about 10:90 to 90:10; and the weight ratio of the first base polymer to the second base polymer ranges from about 10:90 to about 90:10, and the GPAM content ranges from about 5% to about 7%;
xxxii. the viscosity of the cationic GPAM composition is from about 10 cPs or more to about 35 cPs or more, for example as measured by a LV Brookfield viscometer at 25° C. and 60 rpm using spindle number 1;
xxxiii. the aqueous carrier comprises water; or
xxxiv. a combination of any two or more of (i)-(xxxiii).

4. The cationic GPAM composition of claim 3, wherein said cationic GPAM in claim 3, embodiments (xvi)-(xix) comprises:
i. the one or more cationic monomers is each selected from the group consisting of acryloyloxy ethyl trimethyl ammonium chloride ("AETAC"), methacryloyloxyethyltrimethylammonium chloride, methacrylamidopropyl trimethylammonium chloride ("MAPTAC"), acrylamidopropyltrimethyl ammonium chloride, methacryloyloxyethyldimethylammonium sulfate, dimethylaminoethyl acrylate, methacryloyloxyethyltrimethylammonium chloride dimethylaminoethyl methacrylate sulfate, dimethylaminopropylmethacrylamide, diallyldimethylammonium chloride ("DADMAC"); dialkylaminoalkyl acrylates and methacrylates and their quaternary or acid salts, including, but not limited to, dimethylaminoethyl acrylate methyl chloride quaternary salt ("DMAEA.MCQ"), dimethylaminoethyl acrylate methyl sulfate quaternary salt ("DMAE-M.MCQ"), dimethyaminoethyl acrylate benzyl chloride quaternary salt ("DMAEA.BCQ"), dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate and diallyldialkylammonium halides such as diallyldiethylammonium chloride and diallyldimethyl ammonium chloride;
ii. the one or more cationic monomers comprises DADMAC;
iii. the one or more cationic monomers comprises acryloyloxyethyltrimethyl ammonium chloride;
iv. the one or more cationic monomers is each selected from the group consisting of DADMAC and acryloyloxyethyltrimethyl ammonium chloride;
v. the one or more cationic monomers is each selected from the group consisting of methacryloyloxyethyltrimethyl ammonium chloride, acryloyloxyethyltrimethyl ammonium chloride, 3-(methacrylamido) propyltrimethyl ammonium chloride, 3-(acryloylamido) propyltrimethyl ammonium chloride, diallyldimethyl ammonium chloride (DADMAC), dimethylaminoethyl acrylate, dimethylaminoethyl methacrylate, and dimethylaminopropylacrylamide, dimethylaminopropylmethacrylamide;

vi. the anionic monomer is selected from acrylic acid, methacrylic acid, maleic acid, itaconic acid, vinyl sulfonic acid, 2-acrylamido-2-methylpropane sulfonic acid (AMPS), acrylamido methane sulfonic acid, acrylamido ethane sulfonic acid, 2-hydroxy-3-acrylamide propane sulfonic acid, styrene sulfonic acid, vinyl phosphonic acid, and combinations thereof, as well as their corresponding water soluble or dispersible alkali metal, alkaline earth metal, and ammonium salts, and any combinations thereof; the first and/or second base polymers comprise a copolymer of (a) acrylamide and/or methacrylamide monomers and (b) said one or more cationic monomers; or vii. a combination of any two or more of (i)-(vi);

wherein said cationic GPAM in claim 3, embodiments (xiv) or (xv) comprises:

viii. the acrylamide-based polymer comprises one or more primary amide-containing monomers;

ix. the acrylamide-based polymer comprises one or more monomers selected from the group consisting of acrylamide, methacrylamide, ethylacrylamide, crotonamide, N-methyl acrylamide, N-butyl acrylamide, N-ethyl methacrylamide, and any combination thereof;

x. the acrylamide-based polymer comprises one or more acrylamide monomers; or xi. a combination of any two or more of (viii)-(x);

wherein said cationic GPAM in claim 3, embodiments ix or x comprises:

xii. the first base polymer and/or the second base polymer is amphoteric and comprises at least one anionic monomer selected from the group consisting of anionic monomers comprising a carboxylic acid functional group, a sulfonic acid functional group, a phosphonic acid functional group, and their corresponding water soluble salts, and any combinations thereof;

xiii. the first base polymer and/or the second base polymer is amphoteric and comprises at least one anionic monomer selected from acrylic acid, methacrylic acid, maleic acid, itaconic acid, vinyl sulfonic acid, 2-acrylamido-2-methylpropane sulfonic acid (AMPS), acrylamido methane sulfonic acid, acrylamido ethane sulfonic acid, 2-hydroxy-3-acrylamide propane sulfonic acid, styrene sulfonic acid, vinyl phosphonic acid, and combinations thereof, as well as their corresponding water soluble or dispersible alkali metal, alkaline earth metal, and ammonium salts, and any combinations thereof, or xiv. a combination of (xii) and (xiii).

5. The cationic GPAM of claim 1, wherein:

i. the weight average molecular weight of the first base polymer ranges from no more than 2 to 25 kDa;

ii. the weight average molecular weight of the second base polymer ranges from at least 100 kDa to 500 kDa;

iii. either or both the first and the second base polymer comprise copolymers of a first monomer comprising acrylamide or methacrylamide and a second monomer comprising DADMAC (dimethyldiallylammonium chloride) or acryloyloxyethyltrimethyl ammonium chloride, wherein the percent ratio of the first and second monomers ranges from about 30:70 to about 70:30;

iv. either or both the first and the second base polymer comprise copolymers of a first monomer comprising acrylamide or methacrylamide and a second monomer comprising DADMAC (dimethyldiallylammonium chloride) or acryloyloxyethyltrimethyl ammonium chloride, wherein the percent ratio of the first and second monomers ranges from about 40:60 to about 60:40, or is about 40:60;

v. in the glyoxalation reaction used to produce the glyoxalated first and the second base polymer, the glyoxal to base polymer ratio ranges from 10:90 to 90:10;

vi. the ratio of the first and second base polymer in the strengthening agent ranges from 20:80 to 80:20, 30:70 to 70:30, or 40:60 to 60:40;

vii. either or both the first and the second base polymer comprise copolymers of acrylamide and DADMAC (dimethyldiallylammonium chloride), the percent ratio of the acrylamide and DADMAC monomers therein ranges from about 40:60 to about 60:40; and the ratio of the first and second base polymer in the strengthening agent ranges from 20:80 to 80:20; or viii. any combination of two, three or more of the foregoing.

6. A paper product comprising one or more cationic GPAM compositions according to claim 1.

7. A method of papermaking, wherein said method comprises adding one or more cationic GPAM compositions according to claim 1 during the papermaking method in an amount effective to increase the wet and/or dry strength of paper products produced by said method, wherein:

i. the one or more cationic GPAM compositions is added to a composition comprising fiber and/or pulp used in the method prior to the paper product being formed;

ii. the one or more cationic GPAM compositions is added to one or more surfaces of the paper product after the paper product is formed; or iii. the one or more cationic GPAM compositions is added to a composition comprising fiber and/or pulp used in the method prior to the paper product being formed, and the one or more cationic GPAM compositions is added to one or more surfaces of the paper product after the paper product is formed.

8. The method of claim 7, wherein:

i. the cationic GPAM composition is added at the wet end of a paper-making facility to a cellulose fiber suspension;

ii. the cationic GPAM composition is added in an amount from about 0.02% by dry weight to about 10% by dry weight of the cellulose fibers;

iii the cationic GPAM composition is added before, during and/or after the paper product is formed;

iv. the cationic GPAM composition is added to one or more surfaces of the paper product after the paper product is formed;

v. the cationic GPAM composition provides a paper strength enhancement to the paper product, e.g., as determined by STFI testing;

vi. the cationic GPAM composition provides a paper strength enhancement to the paper product, e.g., as determined by burst strength testing;

vii. the paper product comprises one or more of handsheets, board-based products, beverage carriers, toweling, milk and juice cartons, food trays, paper bags, liner board for corrugated containers, packaging board grade, and tissue and towel grade, paper materials, paper towels, diapers, sanitary napkins, training pants, pantiliners, incontinence briefs, tampons, pee pads, litter box liners, coffee filters, air filters, dryer pads, floor cleaning pads, absorbent facial tissue, absorbent bathroom tissue, napkins, wrapping paper, and/or other paperboard products such as cartons and bag paper;

viii. the paper product comprises cellulose paperboard webs;

ix. the cationic GPAM composition decreases a drainage time of a treated sample compared to a drainage time without use of the cationic GPAM composition;

x. the cationic GPAM composition increases a drainage rate of a treated sample resulting in an increased paper production rate as compared to a drainage rate without use of the cationic GPAM composition;

xi. the cationic GPAM composition improves drying energy savings of the paper-making method;

xii. the cationic GPAM composition decreases a total solids content of a treated sample, such as the total solids content of white water from tray or silo post sheet forming, compared to the total solids content without use of a cationic GPAM composition; or xiii. a combination of any two or more of (i)-(xii).

9. The method of claim 7, wherein the one or more cationic GPAM compositions comprise a GPAM wherein:

i. the first base polymer and the second base polymer comprises a copolymer of acrylamide or methacrylamide and one or more cationic monomers;

ii. the first base polymer and/or the second base polymer comprises a copolymer of (a) acrylamide and/or methacrylamide and acryloyloxyethyltrimethyl ammonium chloride and/or (b) dimethyldiallylammonium chloride (DADMAC) monomers;

iii. the first base polymer or the second base polymer comprises a copolymer of acrylamide and dimethyldiallylammonium chloride (DADMAC) monomers;

iv. the first base polymer and the second base polymer comprise a copolymer of acrylamide and dimethyldiallylammonium chloride (DADMAC) monomers;

v. the first base polymer and the second base polymer comprise a copolymer of acrylamide and dimethyldiallylammonium chloride (DADMAC) monomers and the glyoxal:base polymer ratio for the glyoxalation reaction ranges from about 10:90 to 90:10;

vi. the first base polymer and the second base polymer comprise a copolymer of acrylamide and dimethyldiallylammonium chloride (DADMAC); the molecular weight of the first base polymer is no more than 5 kDa to 25 kDa and the molecular weight of the second base polymer is at least 50 kDa to 250 kDa;

vii. the first base polymer and the second base polymer comprise a copolymer of acrylamide and dimethyldiallylammonium chloride (DADMAC) monomers; the molecular weight of the first base polymer is no more than 5 kDa to 25 kDa and the molecular weight of the second base polymer is at least 50 kDa to 250 kDa; and the glyoxal:base polymer ratio for the glyoxalation reaction used to glyoxylate the first and/or the second base polymer ranges from about 10:90 to 90:10;

viii. the first base polymer and the second base polymer comprise a copolymer of acrylamide and dimethyldiallylammonium chloride (DADMAC) monomers; the molecular weight of the first base polymer is no more than 5 kDa to 25 kDa and the molecular weight of the second base polymer is at least 50 kDa to 250 kDa; the glyoxal:base polymer ratio for the glyoxalation reaction of the first and/or second base polymer ranges from about 10:90 to 90:10; and the weight ratio of the first base polymer to the second base polymer ranges from about 10:90 to about 90:10; or ix. the first base polymer and the second base polymer comprise a copolymer of acrylamide and dimethyldiallylammonium chloride (DADMAC); the molecular weight of the first base polymer is no more than 5 kDa to 25 kDa and the molecular weight of the second base polymer is at least 50 kDa to 250 kDa; the glyoxal:base polymer ratio for the glyoxalation reaction of the first and/or second base polymer ranges from about 10:90 to 90:10; and the weight ratio of the first base polymer to the second base polymer ranges from about 10:90 to about 90:10, and the GPAM content ranges from about 5% to about 7%.

10. A method of manufacturing one or more paper products, wherein said method comprises: a. providing a composition comprising predominantly cellulose fibers; b. adding a predetermined quantity of one or more cationic GPAM compositions according to claim 1; and c. forming the desired paper product.

11. A method of manufacturing one or more paper products, wherein said method comprises: a. providing a composition comprising any of softwood fiber, hardwood fiber, recycle fiber, refined fiber, or a mixture of any of the foregoing in an amount sufficient to form an overall furnish of from approximately 1 to 100% hardwood fiber, softwood fiber, recycle fiber, refined fiber or a mixture of any of the foregoing; (b) adding a predetermined quantity of one or more cationic GPAM compositions according to claim 1; and (c) forming a paper product by drying via one or more drying means to a desired moisture content level.

12. A method for strengthening paper, comprising contacting pulp fibers with a strengthening resin comprising at least one cationic GPAM composition according to claim 1, and at least partially curing the strengthening resin contacting the pulp fibers to produce a paper product of enhanced strength.

13. A method for preparing the cationic GPAM composition according to claim 1 comprising:

i. glyoxalating the first base polymer in a first glyoxalation reaction comprising glyoxal to produce a first glyoxalated base polymer;

ii. glyoxalating the second base polymer in a second glyoxalation reaction comprising glyoxal to produce a second glyoxalated base polymer; and iii. combining the first glyoxalated base polymer and the second glyoxalated base polymer to produce the cationic GPAM composition;

wherein steps (i) and (ii) can be performed in any order or simultaneously;

or iv. combining the first base polymer and the second base polymer; and v. glyoxalating the combination of the first base polymer and the second base polymer in a glyoxalation reaction comprising glyoxal to produce the cationic GPAM composition;

or vi. glyoxalating the first base polymer in a glyoxalation reaction comprising glyoxal to produce a first glyoxalated base polymer; and vii. adding the second base polymer to the glyoxalation reaction to produce the cationic GPAM composition;

or viii. glyoxalating the second base polymer in a glyoxalation reaction comprising glyoxal to produce a second glyoxalated base polymer; and
ix. adding the first base polymer to the glyoxalation reaction to produce the cationic GPAM composition;
or
x. glyoxalating the first base polymer in a first glyoxalation reaction comprising glyoxal to produce a first glyoxalated base polymer; and
xi. glyoxalating the second base polymer in a second glyoxalation reaction comprising glyoxal and the first glyoxalated base polymer to produce the cationic GPAM composition;
or
xii. glyoxalating the second base polymer in a second glyoxalation reaction comprising glyoxal to produce a second glyoxalated base polymer; and
xiii. glyoxalating the first base polymer in a first glyoxalation reaction comprising glyoxal and the second glyoxalated base polymer to produce the cationic GPAM composition;
or
xiv. glyoxalating the first base polymer in a glyoxalation reaction comprising glyoxal to produce a first glyoxalated base polymer; and
xv. adding the second base polymer and additional glyoxal to the glyoxalation reaction to produce the cationic GPAM composition;
or
xvi. glyoxalating the second base polymer in a glyoxalation reaction comprising glyoxal to produce a second glyoxalated base polymer; and
xvii. adding the first base polymer and additional glyoxal to the glyoxalation reaction to produce the cationic GPAM composition.

14. A cationic GPAM composition produced according to any one of the methods of claim 13.

15. The cationic GPAM composition of claim 14, wherein:
i. The first base polymer and the second base polymer comprises a copolymer of acrylamide or methacrylamide and one or more cationic monomers;
ii. the first base polymer and/or the second base polymer comprises a copolymer of (a) acrylamide and/or methacrylamide and acryloyloxyethyltrimethyl ammonium chloride and/or (b) dimethyldiallylammonium chloride (DADMAC) monomers;
iii. the first base polymer or the second base polymer comprises a copolymer of acrylamide and dimethyldiallylammonium chloride (DADMAC) monomers;
iv the first base polymer and the second base polymer comprise a copolymer of acrylamide and dimethyldiallylammonium chloride (DADMAC) monomers;
v. the first base polymer and the second base polymer comprise a copolymer of acrylamide and dimethyldiallylammonium chloride (DADMAC) and the glyoxal:base polymer ratio for the glyoxalation reaction ranges from about 10:90 to 90:10;
vi. the first base polymer and the second base polymer comprise a copolymer of acrylamide and dimethyldiallylammonium chloride (DADMAC) monomers; the molecular weight of the first base polymer is no more than 5 kDa to 25 kDa and the molecular weight of the second base polymer is at least 50 kDa to 250 kDa;
vii. the first base polymer and the second base polymer comprise a copolymer of acrylamide and dimethyldiallylammonium chloride (DADMAC) monomers; the molecular weight of the first base polymer is no more than 5 kDa to 25 kDa and the molecular weight of the second base polymer is at least 50 kDa to 250 kDa; and the glyoxal:base polymer ratio for the glyoxalation reaction used to glyoxylate the first and/or the second base polymer ranges from about 10:90 to 90:10;
viii. the first base polymer and the second base polymer comprise a copolymer of acrylamide and dimethyldiallylammonium chloride (DADMAC) monomers; the molecular weight of the first base polymer is no more than 5 kDa to 25 kDa and the molecular weight of the second base polymer is at least 50 kDa to 250 kDa; the glyoxal:base polymer ratio for the glyoxalation reaction of the first and/or second base polymer ranges from about 10:90 to 90:10; and the weight ratio of the first base polymer to the second base polymer ranges from about 10:90 to about 90:10; or
ix. the first base polymer and the second base polymer comprise a copolymer of acrylamide and dimethyldiallylammonium chloride (DADMAC) monomers; the molecular weight of the first base polymer is no more than 5 kDa to 25 kDa and the molecular weight of the second base polymer is at least 50 kDa to 250 kDa; the glyoxal:base polymer ratio for the glyoxalation reaction of the first and/or second base polymer ranges from about 10:90 to 90:10; and the weight ratio of the first base polymer to the second base polymer ranges from about 10:90 to about 90:10, and the GPAM content ranges from about 5% to about 7%.

16. A composition comprising one or more cationic GPAM compositions, wherein said one or more cationic GPAM compositions are each produced according to any one or a combination of the methods of claim 13.

17. The paper product of claim 6, wherein in the cationic GPAM composition:
i. the first base polymer and the second base polymer comprises a copolymer of acrylamide or methacrylamide and one or more cationic monomers;
ii. the first base polymer and/or the second base polymer comprises a copolymer of (a) acrylamide and/or methacrylamide and acryloyloxyethyltrimethyl ammonium chloride and/or (b) dimethyldiallylammonium chloride (DADMAC);
iii. the first base polymer or the second base polymer comprises a copolymer of acrylamide and dimethyldiallylammonium chloride (DADMAC);
iv. the first base polymer and the second base polymer comprise a copolymer of acrylamide and dimethyldiallylammonium chloride (DADMAC) monomers;
v. the first base polymer and the second base polymer comprise a copolymer of acrylamide and dimethyldiallylammonium chloride (DADMAC) monomers and the glyoxal:base polymer ratio for the glyoxalation reaction ranges from about 10:90 to 90:10;
vi. the first base polymer and the second base polymer comprise a copolymer of acrylamide and dimethyldiallylammonium chloride (DADMAC) monomers; the molecular weight of the first base polymer is no more than 5 kDa to 25 kDa and the molecular weight of the second base polymer is at least 50 kDa to 250 kDa;
vii. the first base polymer and the second base polymer comprise a copolymer of acrylamide and dimethyldiallylammonium chloride (DADMAC) monomers; the molecular weight of the first base polymer is no more than 5 kDa to 25 kDa and the molecular weight of the second base polymer is at least 50 kDa to 250 kDa; and the glyoxal:base polymer ratio for the glyoxalation reaction used to glyoxylate the first and/or the second base polymer ranges from about 10:90 to 90:1;
viii. the first base polymer and the second base polymer comprise a copolymer of acrylamide and dimethyldiallylammonium chloride (DADMAC) monomers; the molecular weight of the first base polymer is no more than 5 kDa to 25 kDa and the molecular weight of the second base polymer is at least 50 kDa to 250 kDa; the glyoxal:base polymer ratio for the glyoxalation reaction of the first and/or second base polymer ranges from about 10:90 to 90:10; and the weight ratio of the first base polymer to the second base polymer ranges from about 10:90 to about 90:10; or
ix. the first base polymer and the second base polymer comprise a copolymer of acrylamide and dimethyldiallylammonium chloride (DADMAC) monomers; the molecular weight of the first base polymer is no more than 5 kDa to 25 kDa and the molecular weight of the second base polymer is at least 50 kDa to 250 kDa; the glyoxal:base polymer ratio for the glyoxalation reaction of the first and/or second base polymer ranges from about 10:90 to 90:10; and the weight ratio of the first base polymer to the second base polymer ranges from about 10:90 to about 90:10, and the GPAM content ranges from about 5% to about 7%; or
x. a combination of any two or more of (i)-(ix);
and/or said paper product comprises:
xi. at least one paper layer or web containing the cationic GPAM composition;
xii. the cationic GPAM composition on at least one surface of the paper product;
xiii. one or more of paper sheeting, paperboard, tissue paper, and wall board;
xiv. one or more of Kraft paper, sulfite paper, semi-chemical paper, and the like, including paper produced using bleached pulp, unbleached pulp, or combinations thereof;
xv. a fiber-based product;
xvi. one or more of handsheets, board-based products, beverage carriers, toweling, milk and juice cartons, food trays, paper bags, liner board for corrugated containers, packaging board grade, and tissue and towel grade, paper materials, paper towels, diapers, sanitary napkins, training pants, pantiliners, incontinence briefs, tampons, pee pads, litter box liners, coffee filters, air filters, dryer pads, floor cleaning pads, absorbent facial tissue, absorbent bathroom tissue, napkins, wrapping paper, and/or other paperboard products such as cartons and bag paper;
xvii. cellulose paperboard webs;
xviii. cellulose fibers and from about 0.02% to about 10% cationic GPAM composition by dry weight of cellulose fibers;
xix. an improved paper strength, e.g. as determined by STFI testing, compared to a paper product that does not comprise a cationic GPAM composition;
xx. an improved paper strength, e.g. as determined by burst strength testing, compared to a paper product that does not comprise a cationic GPAM composition; or
xxi. a combination of any two or more of (i)-(xx).

* * * * *